United States Patent
Hiramatsu

(10) Patent No.: US 7,456,999 B2
(45) Date of Patent: Nov. 25, 2008

(54) DEVICE LINK PROFILE CREATION METHOD AND DEVICE AND IMAGE PROCESSING APPARATUS

(75) Inventor: Naoko Hiramatsu, Kyoto (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 750 days.

(21) Appl. No.: 10/956,111

(22) Filed: Oct. 4, 2004

(65) Prior Publication Data
US 2005/0225785 A1   Oct. 13, 2005

(30) Foreign Application Priority Data
Mar. 30, 2004   (JP)   ............... 2004-101054

(51) Int. Cl.
H04N 1/60   (2006.01)
H04N 1/46   (2006.01)
G06K 9/00   (2006.01)

(52) U.S. Cl. ............ 358/1.9; 358/3.23; 358/518; 358/523; 358/535; 382/162; 382/167

(58) Field of Classification Search .......... 358/1.9, 358/518–519, 504, 515, 523–524, 535, 3.23; 382/162, 167; 345/600, 603
See application file for complete search history.

(56) References Cited

U.S. PATENT DOCUMENTS

| | | | |
|---|---|---|---|
| 5,881,211 A * | 3/1999 | Matsumura | 358/1.9 |
| 6,014,457 A | 1/2000 | Kubo et al. | |
| 2003/0214661 A1 * | 11/2003 | Kondo | 358/1.9 |
| 2003/0234793 A1 * | 12/2003 | Stokes et al. | 345/600 |

FOREIGN PATENT DOCUMENTS

| | | |
|---|---|---|
| JP | 10-145626 | 5/1998 |
| JP | 2001-078047 | 3/2001 |
| JP | 2001-78047 | 3/2001 |
| JP | 2004-242193 | 8/2004 |

OTHER PUBLICATIONS

*Japanese Office Action dated Apr. 11, 2006 and translation thereof.
U.S. Appl. No. 10/437,077, filed May 14, 2003.

* cited by examiner

*Primary Examiner*—Edward L. Coles
*Assistant Examiner*—Charlotte M Baker
(74) *Attorney, Agent, or Firm*—Buchanan Ingersoll & Rooney PC

(57) ABSTRACT

In order to create a device link profile by which color conversion can be performed with sufficient accuracy even when brightness characteristic equivalent conversion is included, all conversion parameters including the input device profile, the conversion parameters for color space conversion, and the output device profile are divided into a color conversion parameter component FC2 that indicates the parameters for color conversion, a pre-processing component FC1 positioned before the color conversion parameter component FC2, and a post-processing component FC3 positioned after the color conversion parameter component FC2, and if brightness characteristic conversion XLA1 comprising conversion to match the perceived brightness characteristic is included, such brightness characteristic conversion XLA1 is incorporated in the pre-processing FC1 or post-processing component FC3 such that it is not included in the color conversion parameter component FC2, and the pre-processing component FC1, the color conversion parameter component FC2 and the post-processing component FC3 are respectively aggregated as tables LLU1, LLU2 and LLU3 or as conversion calculator.

15 Claims, 19 Drawing Sheets

FIG. 8

LLU2A

| LATTICE POINT NUMBER | RGB | CMYK |
|---|---|---|
| 1(RED) | (255, 0, 0) | (3, 251, 253,0) |
| 2 | (255, 16, 16) | (5, 241, 237,1) |
| 3 | (255, 32, 32) | (2, 225, 221,1) |
| 4 | (255, 48, 48) | (0, 204, 205,0) |
| 5 | (255, 64, 64) | (1, 195, 193,0) |
| 6 | (255, 80, 80) | (4, 171, 170,1) |
| 7 | (255, 96, 96) | (2, 158, 155,2) |
| 8 | (255, 112, 112) | (0, 143, 141,0) |
| 9 | (255, 128, 128) | (2, 127, 128,0) |
| 10 | (255, 144, 144) | (0, 110, 112,0) |
| 11 | (255, 160, 160) | (1, 95, 96, 0) |
| 12 | (255, 176, 176) | (2, 82, 79, 1) |
| 13 | (255, 192, 192) | (0, 62, 63, 0) |
| 14 | (255, 208, 208) | (0, 48, 47, 0) |
| 15 | (255, 224, 224) | (0, 31, 30, 0) |
| 16 | (255, 240, 240) | (2, 15, 16, 0) |
| 17(WHITE) | (255, 255, 255) | (0, 0, 0, 0) |

FIG. 9

LLU2B

| LATTICE POINT NUMBER | RGB | C'M'Y'K' AFTER CORRECTION |
|---|---|---|
| 1(RED) | (255, 0, 0) | (0, 252, 254, 0) |
| 2 | (255, 16, 16) | (0, 244, 240, 0) |
| 3 | (255, 32, 32) | (0, 226, 222, 0) |
| 4 | (255, 48, 48) | (0, 204, 205, 0) |
| 5 | (255, 64, 64) | (0, 195, 193, 0) |
| 6 | (255, 80, 80) | (0, 173, 172, 0) |
| 7 | (255, 96, 96) | (0, 160, 157, 0) |
| 8 | (255, 112, 112) | (0, 143, 141, 0) |
| 9 | (255, 128, 128) | (0, 128, 129, 0) |
| 10 | (255, 144, 144) | (0, 110, 112, 0) |
| 11 | (255, 160, 160) | (0, 95, 96, 0) |
| 12 | (255, 176, 176) | (0, 83, 80, 0) |
| 13 | (255, 192, 192) | (0, 62, 63, 0) |
| 14 | (255, 208, 208) | (0, 48, 47, 0) |
| 15 | (255, 224, 224) | (0, 31, 30, 0) |
| 16 | (255, 240, 240) | (0, 16, 17, 0) |
| 17(WHITE) | (255, 255, 255) | (0, 0, 0, 0) |

DEVICE LINK PROFILE CREATION METHOD AND DEVICE AND IMAGE PROCESSING APPARATUS

CROSS-REFERENCE TO RELATED APPLICATIONS

This application is based on application No. 2004-101054 filed in Japan, contents of which is hereby incorporated by reference.

BACKGROUND OF THE INVENTION

1. Field of the Invention

The present invention relates to a method and associated device that create a device link profile by synthesizing multiple device profiles in order to carry out color matching among multiple devices via a color management system, as well as to an image processing apparatus in which this method is used. The present invention can be used as a color management system for a digital copier, multi-function peripheral (MFP), printer, monitor or other type of image processing apparatus.

2. Description of the Related Art

In general, peripheral devices such as scanners, digital cameras, printers, and displays have mutually different color characteristics depending on the manufacturer and model. In order to obtain consistent color reproduction independently of these various color characteristics while using these peripheral devices, a color management system (CMS) has been proposed and applied.

FIG. 20 shows the flow of data under a conventional color management system CMSj.

In the color management system CMSj shown in FIG. 20, color conversion, brightness characteristic conversion and other various conversions and adjustments are made to color data CD1 output from the input device DV1, and the resulting data is output to the output device DV2 as color data CD2.

For the input device DV1, a scanner, digital camera, display or the like is used, for example. The color data (image data) CD1 handled by the input device DV1 normally comprises RGB color system-based data (RGB color data) that expresses colors using the three primary colors of R (red), G (green) and B (blue). The color data CD1 output by the input device DV1 is dependent on (or subordinate to) the color characteristics of the input device DV1.

A printer, for example, is used as the output device DV2. The color data (image data) CD2 handled by the output device DV2 is normally CMYK color system-based data (CMYK color data) that expresses colors using the four colors of C (cyan), M (magenta), Y (yellow) and K (black), i.e., the three primary colors plus black. The color data CD2 output to the output device DV2 must be created such that it reflects the color characteristics of the output device DV2, and in this respect, the color data CD2 is dependent on the output device DV2 as well.

Because the color systems that express the color data CD1 and CD2 respectively handled by the input device DV1 and output device DV2 are different as described above, and each of the two respective sets of color data CD is dependent on the color characteristics of its associated device, i.e., is device-dependent, in the color management system CMSj, the color data is subjected to color conversion from one color system to the other color system and the differences in the color characteristics are adjusted.

In other words, in the color management system CMSj, a color system such as the XYZ color system or the L*a*b* color system is used as a color system that is independent from either device, i.e., is device-independent. In order to perform conversion from color data CD that is dependent on the respective devices to color data CE that is expressed in a color system independent from either device, a device profile prepared for each device is referred to.

In other words, in order to convert RGB color data CD1 associated with the input device DV1 into XYZ color system-based data (XYZ color data) CE1, an input profile PF1$j$ comprising an input device profile is consulted. Similarly, for the output device DV2, in order to convert L*a*b* color system (hereinafter 'Lab color system')-based color data (Lab color data) CE2 into CMYK color data CD2, an output profile PF2$j$ comprising an output device profile is consulted. For these device profiles, profiles prepared in accordance with the standards established by the ICC (International Color Consortium) are normally used (ICC profiles).

The input profile PF1$j$ comprises a one-dimensional lookup table LUT1 and a matrix MX1, for example. The one-dimensional lookup table LUT1 is used to correct the brightness characteristic of the input device DV1. The matrix MX1 comprises calculation formulae or coefficients for calculation used to convert the corrected color data CD1 into XYZ color data CE1.

The output profile PF2$j$ comprises a one-dimensional lookup table LUT2, a three-dimensional lookup table LUT3 and a one-dimensional lookup table LUT4, for example. The one-dimensional lookup tables LUT2 and LUT4 are used for adjustment of such things as variations in brightness and image contrast in the output device DV2. The three-dimensional lookup table LUT3 is a lookup table used for converting Lab color data CE2 into CMYK color data CD2.

The XYZ color data CE1 is converted into the Lab color data CE2 in a color conversion unit CC1$j$. In addition, gamut mapping GM is carried out in the color conversion unit CC1$j$ either before or after color conversion XL. During gamut mapping GM, mapping according to a prescribed conversion method is performed such that the color data CD2 stays within a range (color range) that can be reproduced by the output device DV2. For this gamut mapping GM, four methods, i.e., a perceptual method, a method in which a relative color range is maintained, a method in which the absolute color range is maintained and a method that maintains the saturation are known.

The color conversion and the like performed under the color management system CMSj described above is in actuality carried out by a color management module. This color management module (CMM) performs color matching between the input device DV1 and the output device DV2 via the device-independent color spaces using the input profile PF1$j$ and the output profile PF2$j$. For this color matching, the color management module holds the color conversion steps that include the use of the input profile PF1$j$, color conversion unit CC1$j$, and output profile PF2$j$ in a single device link profile in advance, and directly converts the input color data CD1 into the color data CD2 using the device link profile (see Japanese Laid-Open Patent Application 2001-78047).

For such device link profiles, the ICC profiles referred to above are generally used.

FIG. 21 shows the construction of a link profile LP1$j$ comprising a commonly used device link profile, and FIG. 22 shows the functions of the multidimensional lookup table LLU2$j$ in the link profile LP1$j$.

With reference to FIG. 21, the link profile LP1$j$ consists of three tables, i.e., an input one-dimensional lookup table LLU1$j$, a multidimensional lookup table LLU2$j$ and an output one-dimensional lookup table LLU3$j$. The input one-dimensional lookup table LLU1j is identical to the one-dimensional lookup table LUT1 shown in FIG. 20, and the output one-dimensional lookup table LLU3j is identical to the one-dimensional lookup table LUT4 shown in FIG. 20. The multidimensional lookup table LLU2j is a table incorporating the functions of the color management system CMSj shown in FIG. 20 and excluding the two one-dimensional lookup tables LUT1 and LUT4, as shown in FIG. 22.

As described above, the link profile LP1j consists of three tables into which the color conversion steps are divided. The multidimensional lookup table LLU2j, which is used for the main processing, includes the functions to perform color conversion XL from the XYZ color system to the Lab color system.

Incidentally, while the geometric coordinate distance in the xy chromaticity diagram in the XYZ color system does not match human visual perception, the Lab color system is an uniform color space (UCS) in which the coordinate distance in the chromaticity diagram matches human visual perception. Therefore, color conversion XL from the XYZ color system to the Lab color system includes conversion to match the perceived brightness characteristic.

Specifically, conversion from XYZ values to Lab values is expressed by the following mathematical formulae.

$L = 116(Y)^{1/3} - 16$ $a = 500(X1/3 - Y1/3)$ $b = 200(Y1/3 - Z1/3)$

In other words, in the Lab color system, the brightness characteristic or tone changes as a function that is expressed as the cubic root of the XYZ color system. Therefore, when a multidimensional lookup table LLU2j that includes such color conversion XL is created, the input value and the output value of the table increase or decrease at different rates. For example, where the input value increases at an uniform rate, the output value increases at a diminishing rate as the input value increases. Conversely, where the output value increases at a uniform rate, the input value increases at an increasingly high rate as the output value increases.

Consequently, the problem arises that when the values for the color data to be output are sought via interpolation based on the color data values that are actually input, sufficient accuracy is not obtained.

OBJECT AND SUMMARY

An object of the present invention is to create a device link profile by which color conversion can be performed with sufficient accuracy even where brightness characteristic equivalent conversion is included therein.

The method pertaining to the present invention is a method to create a device link profile by which to carry out color conversion among multiple devices, wherein the overall conversion parameters including an input device profile, color space conversion parameters and an output device profile are divided into a color conversion parameter component that indicates the parameters for color conversion, a pre-processing component positioned before the color conversion parameter component, and a post-processing component positioned after the color conversion parameter component, and wherein if brightness characteristic conversion comprising conversion to match the perceived brightness characteristic is included, such brightness characteristic conversion is incorporated in the pre-processing or post-processing component such that it is not included in the color conversion parameter component, and the pre-processing component, color conversion parameter component and post-processing component are respectively aggregated as tables or conversion calculation units.

Using this method, even if brightness characteristic equivalent conversion is included, such conversion is incorporated in the pre-processing or post-processing component, the input/output relationship for the color conversion parameter component, which comprises a multidimensional lookup table or the like, becomes close to a linear relationship, and the rate at which the output value increases does not change significantly as the input value increases. As a result, color conversion with sufficient accuracy can be achieved even if interpolation is performed.

When conversion from a non-uniform color space relative to human perception to a uniform color space is included in the color space conversion parameters, it is preferred that (i) the brightness characteristic conversion included therein be incorporated in the pre-processing component, and (ii) the pre-processing component be aggregated as a single one-dimensional lookup table.

In addition, when conversion from a non-uniform color space relative to human perception to a uniform color space is included in the color space conversion parameters, it is preferred that (i) the inverse brightness characteristic conversion included therein be incorporated in the post-processing component, and (ii) the post-processing component be aggregated as a single one-dimensional lookup table.

The image processing apparatus pertaining to the present invention has an obtaining unit that obtains color conversion profiles regarding multiple devices, a creation unit that creates a device link profile by synthesizing the multiple profiles, and a color conversion unit that performs color conversion using the created device link profile, wherein the device link profile is constructed such that it includes an input one-dimensional lookup table, a multidimensional lookup table or matrix and an output one-dimensional lookup table, and where brightness characteristic conversion to match the perceived brightness characteristic is included in the device link profile, the brightness characteristic conversion is incorporated in the input one-dimensional lookup table or the output one-dimensional lookup table to prevent it from being included in the multidimensional lookup table or matrix.

Inclusion of the brightness characteristic conversion in the color conversion parameter component can be prevented by ensuring that the brightness characteristic conversion is not included as a practical matter in the color conversion parameter component. In this Specification, the term 'brightness characteristic' may include the brightness characteristic in a narrow sense of the term as well as an inverse brightness characteristic. In addition, the term 'brightness characteristic conversion' may include brightness characteristic conversion in a narrow sense of the term as well as an inverse brightness characteristic conversion. In particular, where brightness characteristic conversion and inverse brightness characteristic conversion are not separately indicated, it may be assumed that brightness characteristic conversion includes inverse brightness characteristic conversion.

These and other objects, advantages and features of the invention will become apparent from the following description thereof taken in conjunction with the accompanying drawings which illustrate specific embodiments of the invention.

BRIEF DESCRIPTION OF THE DRAWINGS

FIG. 8 shows an example of a multidimensional lookup table;

FIG. 9 is an example of a corrected multidimensional lookup table;

In the following description, like parts are designated by like reference numbers throughout the several drawings.

BRIEF DESCRIPTION OF THE PREFERRED EMBODIMENTS

Embodiments of the printer pertaining to the present invention are described in detail below with reference to the accompanying drawings.

First Embodiment

Figure 1:
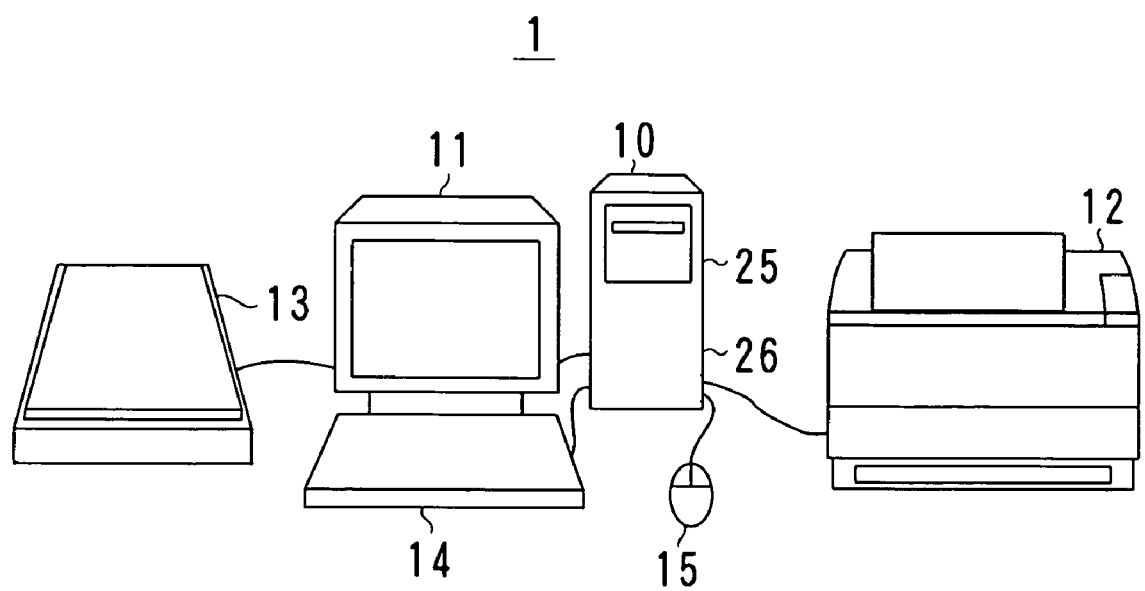
FIG. 1 shows the overall external view of an image processing system pertaining to the present invention.
Figure 2:
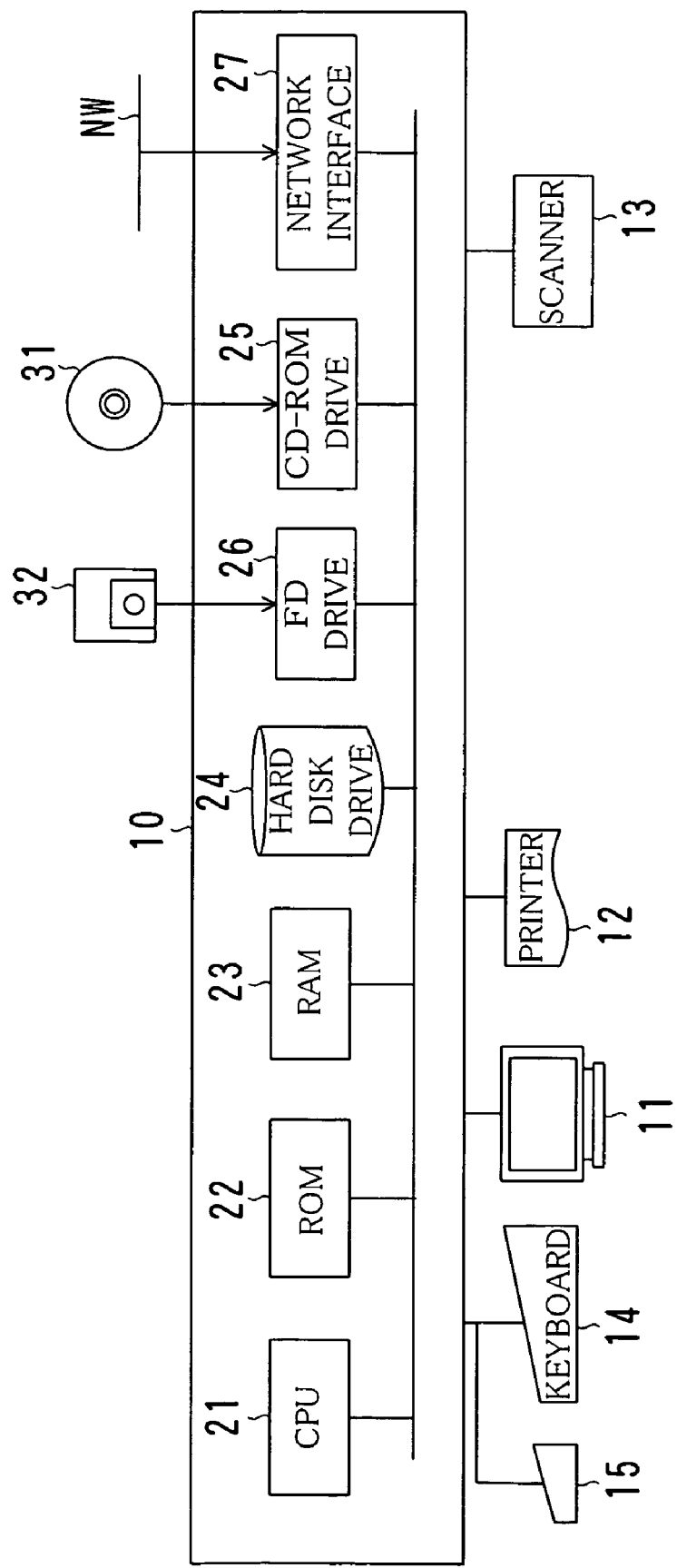
FIG. 2 is a block diagram showing the construction of the image processing system.

FIG. 1 shows the overall external view of the image processing system 1 pertaining to the present invention. FIG. 2 is a block diagram showing the construction of the image processing system 1.

With reference to FIG. 1, the image processing system 1 comprises a main processor 10, a display 11, a printer 12, a scanner 13, a keyboard 14, a mouse 15 and the like.

With reference to FIG. 2, the main processor 10 includes a CPU 21, a ROM 22, a RAM 23, a hard disk 24, a CD-ROM (Compact Disk Read-Only Memory) drive 25, an FD (Flexible Disk) drive 26, and a network interface 27. These elements and devices of the main processor 10 are mutually connected via appropriate buses or interfaces.

The ROM 22 stores the boot-up program and the like for the operating system. The RAM 23 loads programs executed by the CPU 21 and stores them. The RAM 23 loads and temporarily stores various types of data, files and tables during execution of a program, and is also used as a work area during processing. The hard disk 24 stores programs and data. A CD-ROM 31 is mounted in the CD-ROM drive 25, and an FD 32 is mounted in the FD drive 26. They are respectively accessed when necessary. The network interface 27 is used to connect the main processor 10 to the network NW.

An ordinary personal computer can be used as the main processor 10.

The profiles (device profiles) of the display 11, printer 12 and scanner 13 are stored on the hard disk 24.

The profiles may be input to the main processor 10 from each device, or profiles recorded on the CD-ROM 31 or FD 32 may be input via the CD-ROM drive 25 or FD drive 26. Alternatively, the profiles may be input via the network interface 27 from the other devices such as the printer and computer connected to the network NW. These profiles are stored on the hard disk 24 while associated with each device.

The display 11 profile or scanner 13 profile can become an input profile PF1. The printer 12 profile or display 11 profile can become an output profile PF2.

In the first embodiment, the main processor 10 creates a link profile LP1 by linking the input profile PF1 and the output profile PF2 via execution by its CPU 21 of a link file creation program. The created link profile LP is stored in the RAM 23 or on the hard disk 24.

Generally, such a link profile creation program is stored on a recording medium such as the CD-ROM 31 or FD 32 for distribution, read from the recording medium via the CD-ROM drive 25 or FD drive 26 and stored on the hard disk 24. It is then loaded from the hard disk 24 into the RAM 23 for execution by the CPU 21.

As the recording medium, a magnetic tape, cassette tape, optical disk, opto-magnetic disk, or semiconductor memory such as an IC card, optical card, mask ROM, EPROM, EEPROM or flash ROM may be used. The term 'program' means not only a program that can be directly executed by the CPU 21, but also a program in a source program format, a compressed program, an encoded program or the like.

In the operational example pertaining to the first embodiment, image processing including color conversion is carried out by the main processor 10 to the image data (color data) read by the scanner 13, and the resulting image is printed on paper by the printer 12. When this is done, in the main processor 10, a link profile LP1 is created wherein the scanner 13 profile comprises an input profile PF1 and the printer 12 profile comprises an output profile PF2.

In another operational example, the user causes the main processor 10 to execute an image draw program. The user creates image data via the operation of the keyboard 14 and mouse 15 while viewing the image displayed on the display 11, and the image data thus created is used as the input image data (color data). In this case, the display 11 is used as an input device, and the display 11 profile is used as an input profile PF1.

Furthermore, in yet another operational example, color data is input using any of various devices and profiles, or color data is received and input from a different device, and color conversion is carried out to the input color data. The post-processing color data is displayed on any of various types of devices, is printed or sent to a different device.

Figure 3:
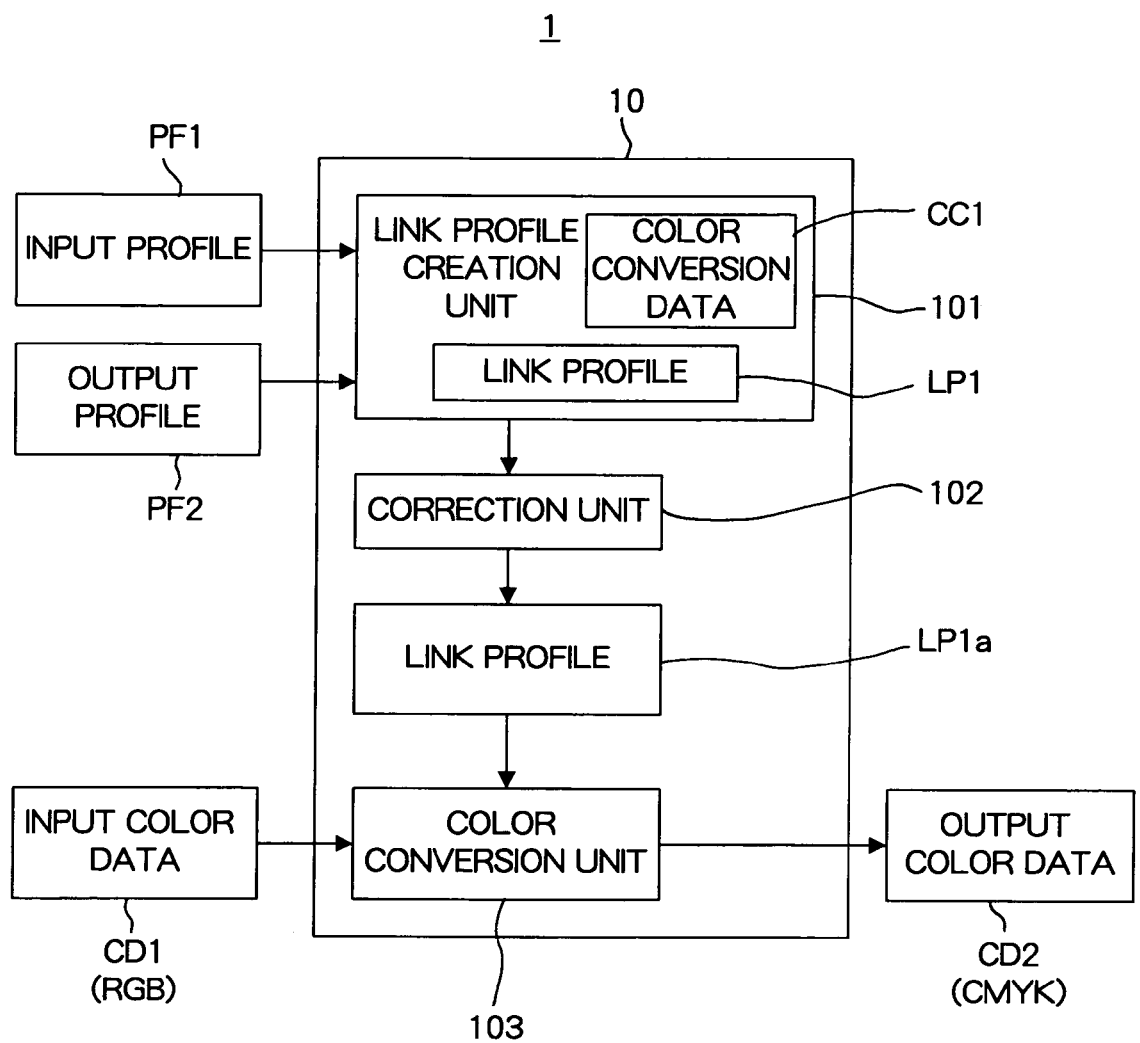
FIG. 3 is a block diagram showing the functions of the image processing system of a first embodiment.
Figure 4:
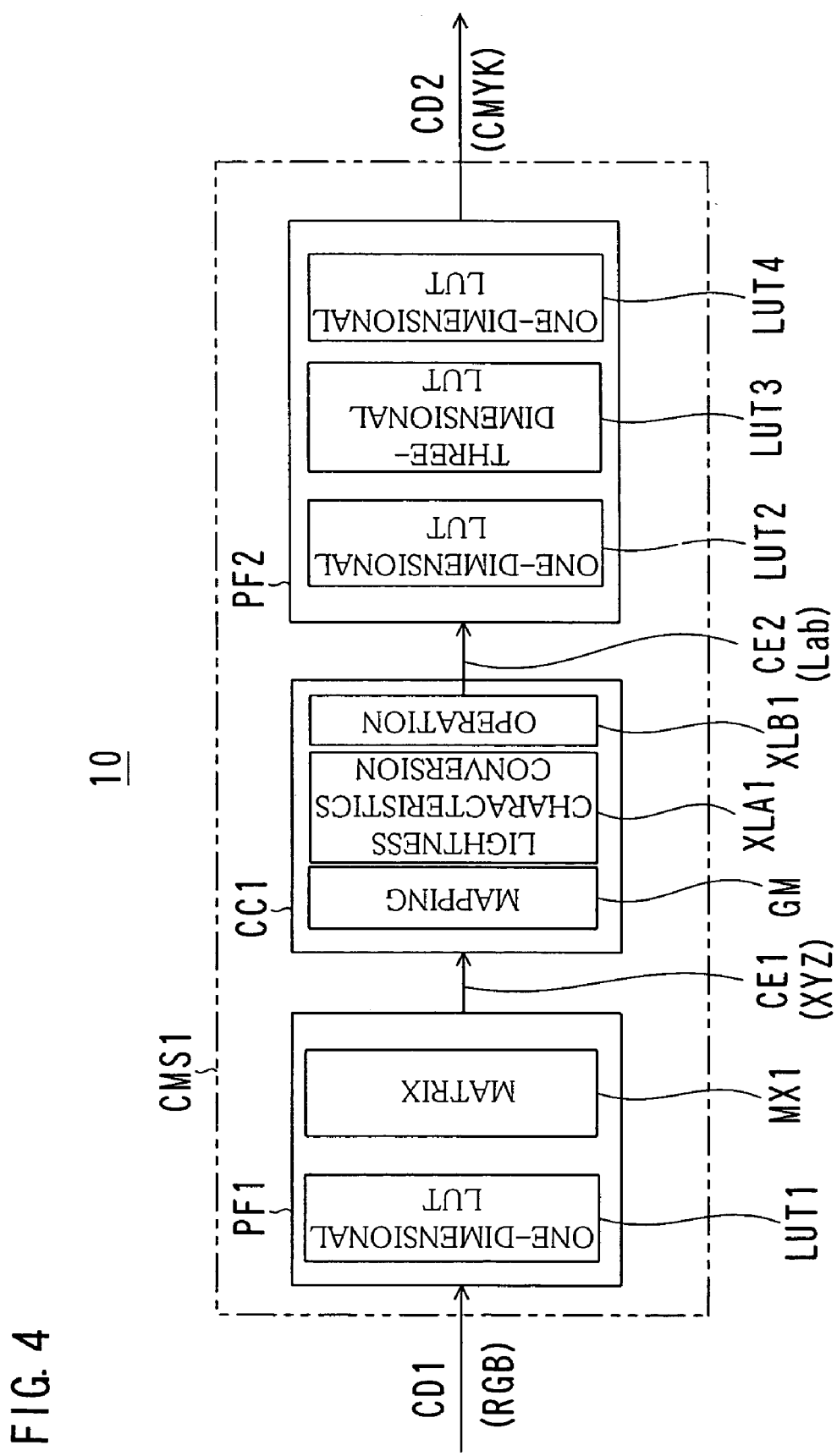
FIG. 4 shows an example of the functions of the color management system in the main processor.
Figure 5:
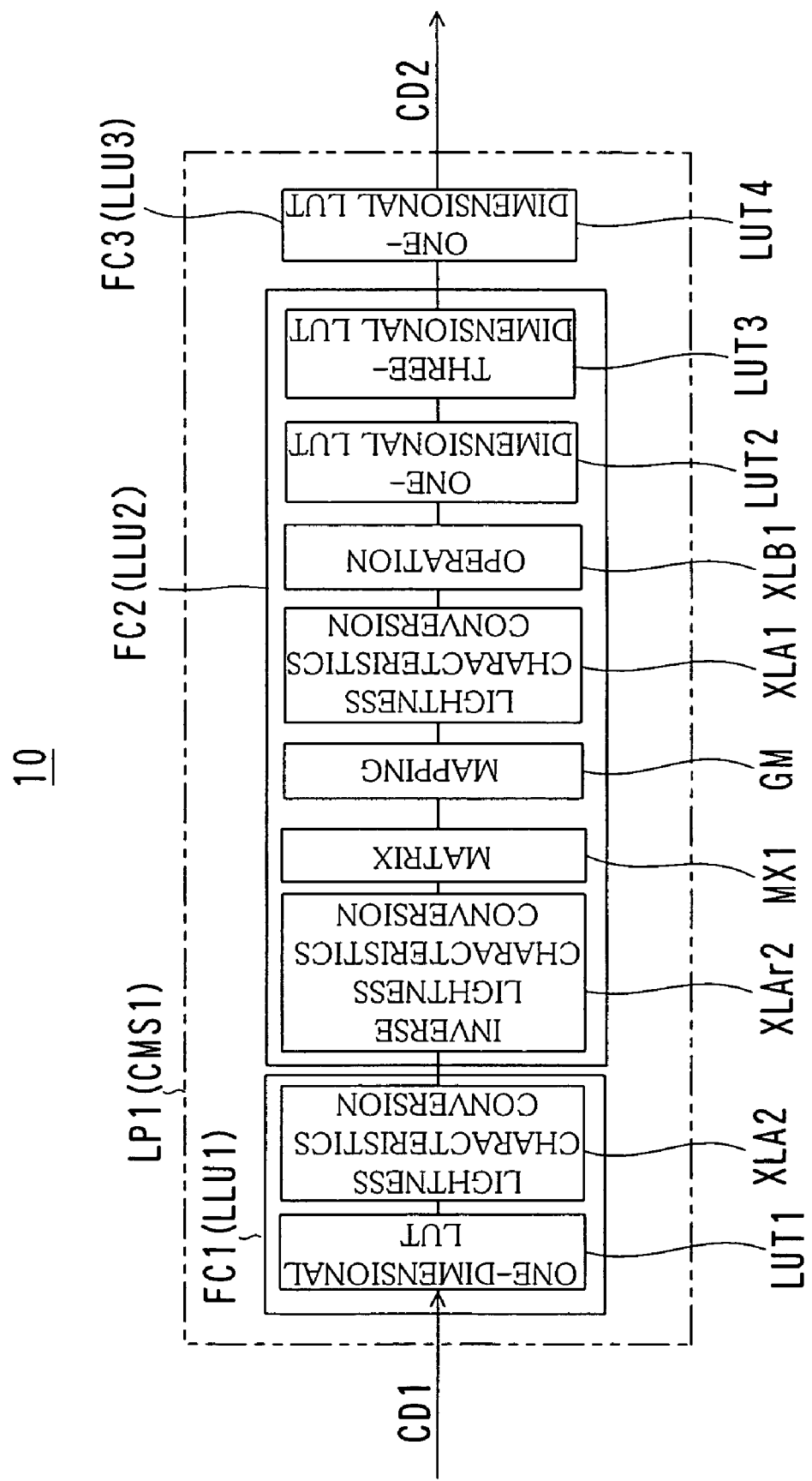
FIG. 5 shows an example of the functions of a link profile created in the main processor.
Figure 6:
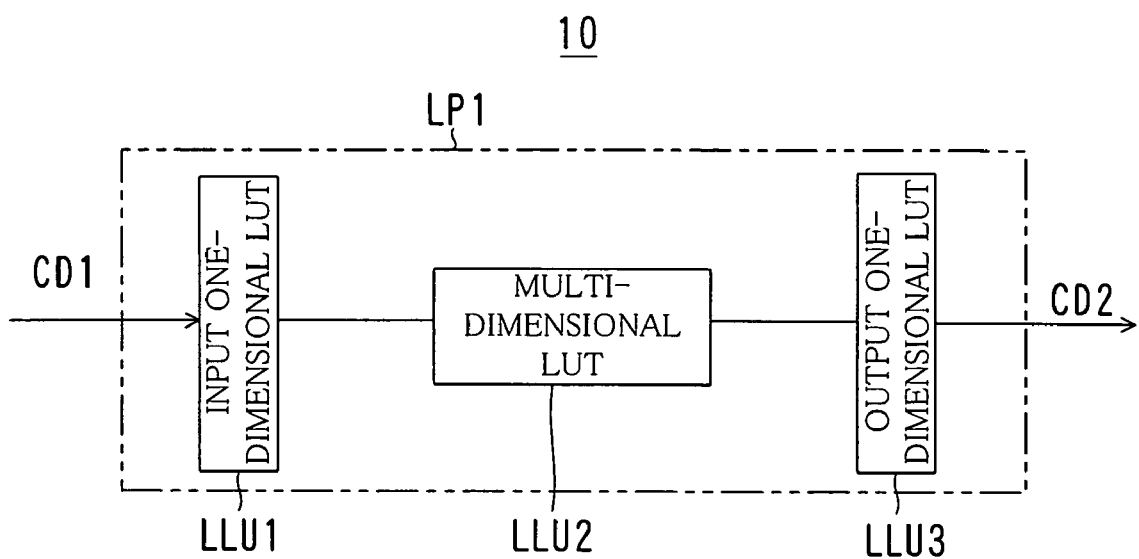
FIG. 6 shows an example of the construction of the link profile.

FIG. 3 is a block diagram showing the functions of the image processing system 1 of the first embodiment. FIG. 4 shows an example of the functions of the color management system CMS1 in the main processor 10. FIG. 5 shows an example of the functions of the link profile LP1 created in the main processor 10. FIG. 6 shows an example of the construction of the link profile LP1. FIG. 7 shows brightness and inverse brightness characteristics. FIG. 8 shows an example of a multidimensional lookup table LLU2. FIG. 9 shows an example of a corrected multidimensional lookup table LLU2a.

With reference to FIG. 3, the main processor 10 includes a link profile creation unit 101, a correction unit 102, a color conversion unit 103, and color conversion data CC1. The input profile PF1 and output profile PF2 are loaded into the main processor 10, and are temporarily stored in the internal RAM 23 or the like.

The link profile creation unit 101 creates a link profile LP1 by referring to the input profile PF1, the output profile PF2 and the color conversion data CC1. The created link profile LP1 is stored in an appropriate area of the memory. The processing to create a link profile LP1 by the link profile creation unit 101 is described in detail below. The correction unit 102 corrects the created link profile LP1, and outputs a corrected link profile LP1a.

The RGB input color data CD1 that is read by the scanner 13 is input to the main processor 10. The color conversion unit 103 converts the input color data CD1 into CMYK output color data CD2 with reference to the link profile LP1a. The output color data CD2 is output to the printer 12, whereupon it is printed.

Such processing operations or functions in the main processor 10 are realized via execution of the link file creation program by the CPU 21, but all or part of such operations or functions may be realized via hardware.

As shown in FIG. 4, the color data CD1 is subjected to color conversion, brightness characteristic conversion and other various conversions and adjustments based on the input profile PF1, color conversion data CC1 and output profile PF2 by the color management system CMS1 in the main processor 10, and is output as color data CD2. The functions of the color management system CMS1, i.e., the overall processing operations performed to the color data CD1, are identical to those of the color management system CMSj shown in FIG. 20.

In other words, the input profile PF1 consists of device characteristics description data that describes the characteristics of the input device. In the first embodiment, the input profile PF1 comprises, like the input profile PF1j described with reference to FIG. 20, a one-dimensional lookup table LUT1 and a matrix MX1.

The one-dimensional lookup table LUT1 is used to correct the brightness characteristic (tone) of the scanner 13, which comprises the input device. The matrix MX1 is a matrix that associates the RGB colors unique to the scanner 13 (dependent colors) and device-independent XYZ colors (independent colors). That is, the matrix MX1 comprises coefficients for the calculation to convert the corrected color data CD1 into XYZ color data CE1.

The output profile PF2 consists of device characteristics description data that describes the characteristics of the output device. In the first embodiment, the output profile PF2 comprises, like the output profile PF2j described with reference to FIG. 20, a one-dimensional lookup table LUT2, a three-dimensional lookup table LUT3 and a one-dimensional lookup table LUT4.

The one-dimensional lookup tables LUT2 and LUT4 are used to make adjustments regarding density variations in the printer 12, which is the output device, and the image contrast, respectively. The three-dimensional lookup table LUT 3 is a lookup table that associates the CMYK colors unique to the printer 12 (dependent colors) and device-independent Lab colors (independent colors). That is, the Lab color data CE2 is converted into CMYK color data CD2 using the three-dimensional lookup table LUT 3.

Device-dependent color spaces such as the RGB color system and CMYK color system and color spaces such as the XYZ color system are non-uniform color spaces, while color spaces designed to have uniform perceptual properties, such as the Lab color system, are uniform color spaces.

Figure 20:
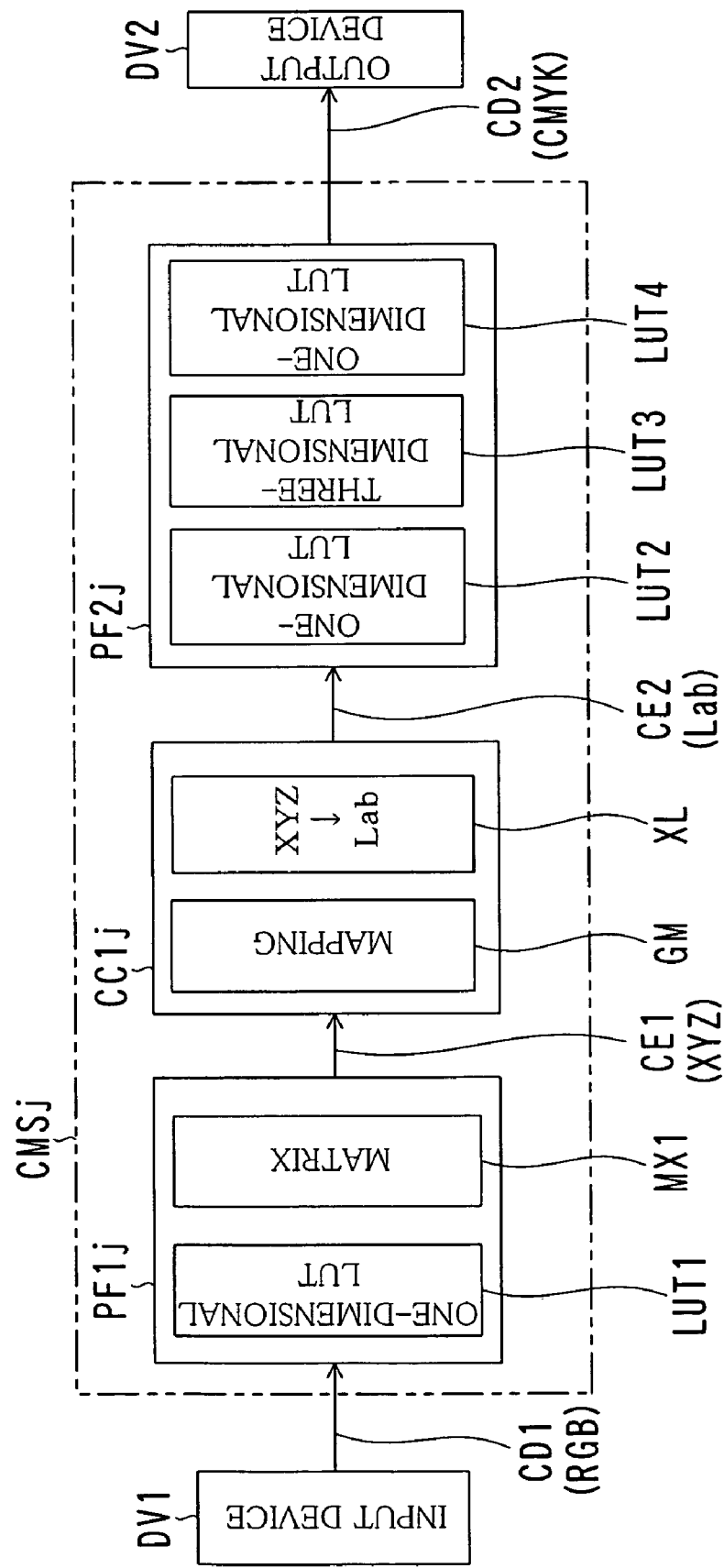
FIG. 20 shows the sequence of data in a conventional color management system.
Figure 21:
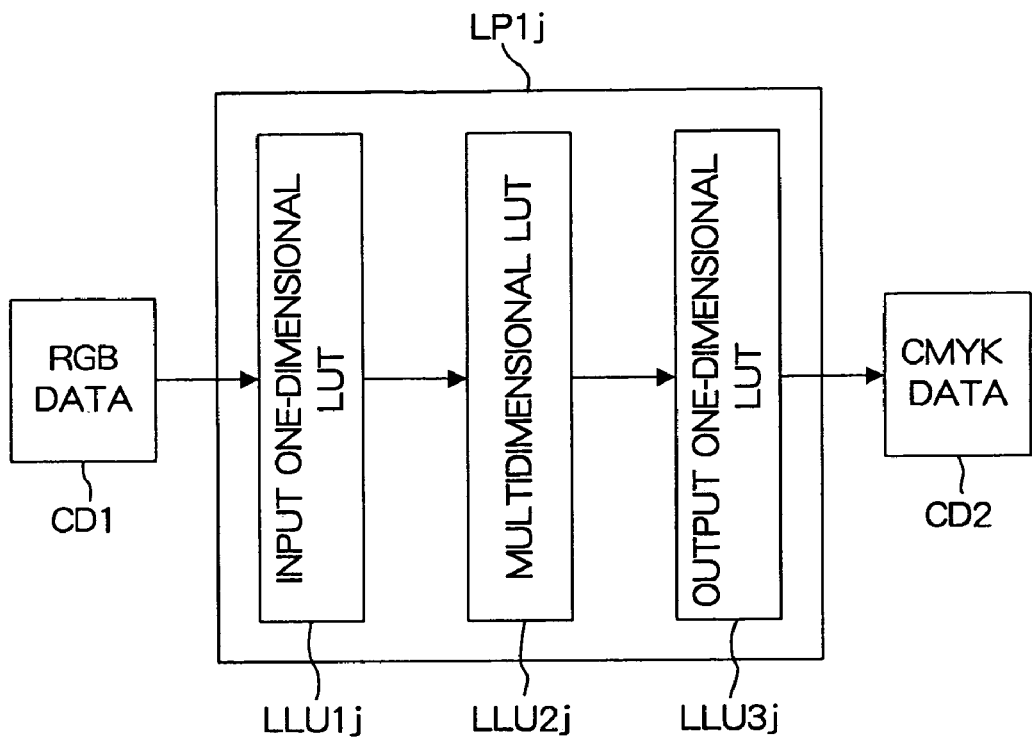
FIG. 21 shows the construction of a common link profile.
Figure 22:
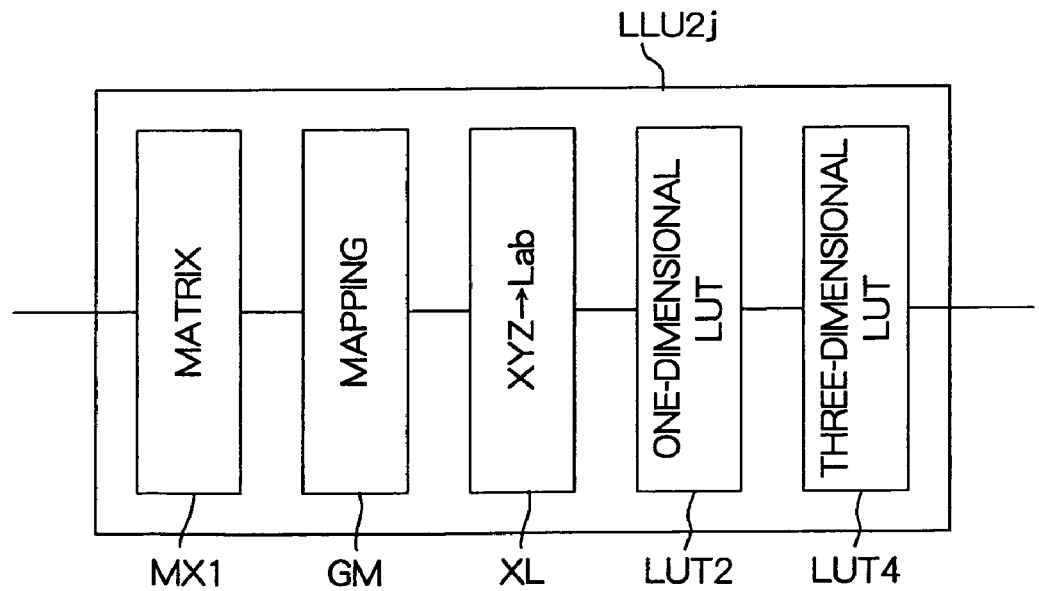
FIG. 22 shows the functions of a multidimensional lookup table.

The color conversion data CC1 has a function equivalent to the color conversion unit CC1j shown in FIG. 20, and includes data or formulae used to perform color conversion of XYZ color data CE1 into Lab color data CE2, as well as data or formulae for gamut mapping GM.

However, in the color conversion data CC1 of the first embodiment, the data or formulae for color conversion XL are divided into brightness characteristic conversion XLA1 and calculation XLB1, as shown in FIG. 4.

In other words, as described above, conversion of XYZ values into Lab values are expressed by the following mathematical formulae (1).

$$L=116(Y)^{1/3}-16$$
$$a=500(X1/3-Y1/3) \quad (1)$$
$$b=200(Y1/3-Z1/3)$$

Here, the terms X1/3, Y1/3 and Z1/3 in the formulae (1) are considered to be functions of X, Y and Z, and are expressed by the following mathematical formulae (2).

$$f(X)=X1/3$$
$$f(Y)=Y1/3 \quad (2)$$
$$f(Z)=Z1/3$$

As a result, the equations (1) above can be written as the following mathematical formulae (3).

$$L=116 \times f(Y)-16$$
$$a=500 \times [f(X)-f(Y)] \quad (3)$$
$$b=200 \times [f(Y)-f(Z)]$$

The conversion expressed by the formulae (2) is deemed brightness characteristic conversion XLA1, and the conversion expressed by the formulae (3) is deemed calculation XLB1. In the brightness characteristic conversion XLA1, the cubic root of the input value Y becomes the output value f(Y). In the brightness characteristic conversion XLA1, the XYZ values are converted into values that have a linear relationship to the 'L' of the Lab color system that represents a brightness close to human perception (visual perception).

Strictly speaking, the content of the function f(Y) varies depending on the value of Y as shown below.

Where Y>0.008856:

$$f(Y)=Y1/3$$

Where Y<0.008856:

$$f(Y)=7.787XY+16/116$$

Figure 7A:
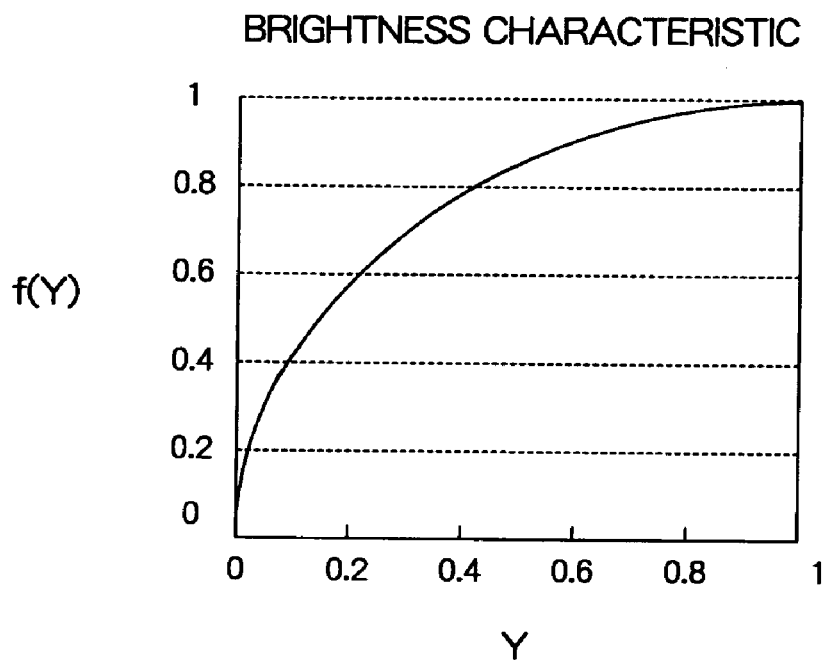
FIG. 7 shows brightness and inverse brightness characteristics.

As shown in FIG. 7(A), the brightness characteristic used in the brightness characteristic conversion XLA1 is a curve that corrects the perceived brightness characteristic, and when the value of Y is small, the curve is more vertical, but becomes more horizontal as the value of Y increases. In other words, the rate of increase of the output value, i.e., the value of f(Y), changes substantially as the input value, i.e., the value of Y, increases.

Here, conversion that is the reverse of the brightness characteristic conversion XLA1 described above, i.e., conversion expressed by the following mathematical formula (4), is defined as inverse brightness characteristic conversion XLAr.

$$fr(Y)=Y3 \quad (4)$$

In other words, in the inverse brightness characteristic conversion XLAr, the third power of the input value Y becomes the output value fr(Y). The inverse brightness characteristic used in such inverse brightness characteristic conversion XLAr is represented by a curve that is relatively flat when the value of Y is small, but becomes more vertical as the value of Y increases.

In the first embodiment, in the color management system CMS1 shown in FIG. 4, the brightness characteristic conversion XLA2 and inverse brightness characteristic conversion XLAr are inserted between the one-dimensional lookup table LUT1 and the matrix MX1 in order to create the link profile LP1. The brightness characteristic conversion XLA2 is equal to the brightness characteristic conversion XLA1. The inverse brightness characteristic conversion XLAr2 is equal to the inverse brightness characteristic conversion XLAr described above. This state is shown in FIG. 5.

In other words, in the color management system CMS1 shown in FIG. 5, each function, such as the brightness characteristic conversion XLA2, the inverse brightness characteristic conversion XLAr2 and the matrix MX1, is placed after the one-dimensional lookup table LUT1. The one-dimensional lookup table LUT1 and the brightness characteristic conversion XLA2 are aggregated as a single function component FC1, the inverse brightness characteristic conversion XLAr2, matrix MX1, gamut mapping GM, brightness characteristic conversion XLA1, calculation XLB1, one-dimensional lookup table LUT2 and three-dimensional lookup table LUT3 are aggregated as a single function component FC2, and the one-dimensional lookup table LUT4 is deemed one function component FC3 by itself.

Subsequently, an input one-dimensional lookup table LLU1, a multidimensional lookup table LLU2 and an output one-dimensional lookup table LLU3 are created such that the function components FC1, FC2 and FC3 are respectively represented thereby, as shown in FIG. 6.

In other words, the brightness characteristic conversion XLA is included in the input one-dimensional lookup table LLU1 in addition to the one-dimensional lookup table LUT1. The synthesized result of the two functions become the input one-dimensional lookup table LLU1.

The inverse brightness characteristic conversion XLAr2 is first applied in the multidimensional lookup table LLU2. The synthesized result, which includes the inverse brightness characteristic conversion XLAr2, is the multidimensional lookup table LLU2. Therefore, inside the multidimensional lookup table LLU2, the inverse brightness characteristic of the inverse brightness characteristic conversion XLAr2 and the brightness characteristic of the brightness characteristic conversion XLA1 offset each other, making the input/output relationship of the multidimensional lookup table LLU2 closer to a linear relationship. Consequently, the relationship between the rate at which the input value increases and the rate at which the output value increases in the multidimensional lookup table LLU2 becomes essentially uniform, and sufficient accuracy can be obtained when seeking the color data values to output via interpolation based on the input color data values, resulting in improved interpolation accuracy. Furthermore, in many situations, because interpolation is performed in a color space that has properties close to human visual perception, color conversion focusing on color regions with relatively high human visual perception sensitivity can be performed.

Various public-domain methods can be used to create the tables LLU1, LLU2 and LLU3. For example, in one method, data comprising various values is input to each of the function components FC1, FC2 and FC3, the output values for each input are calculated, and the input values and output values are recorded in the lookup table format. When this is done, input and output values ranging from the smallest value to the largest value should be delimited into appropriate numbers in order to obtain an appropriate number of data sets. For example, where the multidimensional lookup table LLU2 is created, the input RGB values should be delimited by 16, and a lattice point number from 1 to 17 should be assigned to each RGB value combination, such that an output CMYK value can be obtained for each lattice point representing each RGB value combination. In this case, there will be 17×17×17 data sets.

In this case, because the number of data sets available from the multidimensional lookup table LLU2 is limited, data that is precisely identical to the input color data values does not often exist. In such a case, the color data values to be output are sought via interpolation.

The multidimensional lookup table LLU2A shown in FIG. 8 is part of the 17×17×17 data sets created in the method described above. In other words, RGB colors are expressed using 256 tones for each RGB color component, and the data for every 16th tone value is included in the table. FIG. 8 shows the corresponding CMYK values for the RGB data for the lattice points that exist on a hue line extending from R (red) to W (white).

In the multidimensional lookup table LLU2A shown in FIG. 8, the data sets having a lattice point number 1 to 17 have the maximum R value '255', while the G and B values vary between 0 and 255. The CMYK values are sought through calculation and recorded for these RGB values.

The correction unit 102 performs appropriate correction to the created multidimensional lookup table LLU2. As such correction, pure color processing is carried out, for example.

In other words, pure R (red) color can be ordinarily obtained by mixing M (magenta) and Y (yellow) without the inclusion of C (cyan). However, during actual use of an output device, a small amount of C (cyan) may be included in order to express R (red) due to the color characteristics of the ink or toner used. In such a case, the amount of C (cyan), i.e., the tone value for C, is made 0, meaning that only M (magenta) and Y (yellow) are used. When this is done, in order to prevent the shade of the color from changing, the concentration of M (magenta) and Y (yellow) are increased to the extent of the reduction of C (cyan). In addition, for example, because mixing pure R (red) and G (green) results in Y (yellow), this color is expressed using only Y (yellow). The processing to output color data using one coloring agent or two coloring agents in this way is called 'pure coloring' or 'pure color processing' in this Specification.

Specifically, in the multidimensional lookup table LLU2A shown in FIG. 8, regarding the data set having the lattice point number '1', the CMYK values (3, 251, 253, 0) correspond to the RGB values (255, 0, 0). Regarding the data set having the lattice point number '2', the CMYK values (5, 241, 237, 1) correspond to the RGB values (255, 16, 16). According to these conversion values, pure R (red) color is expressed by a mixture of three CMY colors or four CMYK colors. Therefore, in order for the color red to be expressed using two colors only, processing is carried out such that the colors (components) not associated with R (red), i.e., C (cyan) and K (black), are replaced by colors associated with R (red), i.e., M (magenta) and Y (yellow). C (cyan) and K (black) may be replaced equally by M and Y, but weighted replacement is also acceptable. If the post-correction M or Y exceeds the upper limit value '255', such value should be replaced with the upper limit value '255'.

The multidimensional lookup table LLU2B shown in FIG. 9 is the multidimensional lookup table LLU2A shown in FIG. 8 after it has undergone pure color processing.

Such pure color processing can be effectively applied to images (color data) created via computer graphics, for example.

In addition, in the correction unit 102, correction may be performed regarding lattice points in the multidimensional lookup table LLU2 that exist on a hue line that extends from B (blue) to K (black), for example. In this case, the dependent colors of the printer 12 that are associated with the RGB data sets for the lattice points on the hue line extending from B (blue) to K (black) are corrected such that the difference in the amount of change of each color component between continuous dependent colors becomes small. This correction is carried out for each color.

Specifically, for example, regarding a certain color A, if the data value for the lattice point number (i) before correction is A(i) and the data value after correction is A'(i), the post-correction data value A'(i) is sought using the following mathematical formula.

$$A'(i)=[A(i-1)+A(i)+A(i+1)]/3$$

Here, A(i−1) and A(i+1) are the pre-correction data values for the lattice point numbers (i−1) and (i+1).

By performing such correction, because the target lattice point exists on a prescribed hue line, the effect of interpolation on accuracy can be minimized. Incidentally, correction for lattice points that exist on a hue line extending from W (white) to K (black) is as a practical matter equivalent to gray balance adjustment.

The multidimensional lookup table LLU2B that has undergone correction by the correction unit 102 in this way becomes part of the link profile LP1a.

It is also acceptable if the link profile LP1 created by the link profile creation unit 101 is not subjected to any correction by the correction unit 102 and is used as the link profile LP1a as is.

The color conversion unit 103 converts the input color data CD1 into CMYK output color data CD2 with reference to the corrected link profile LP1a. Because the dependent colors of the printer 12 associated with the link profile LP1a are corrected, the negative effect of interpolation during color conversion of the color data CD1 by the color conversion unit 103 is reduced. For the interpolation processing, the public-domain cubic interpolation method is used, for example.

According to the first embodiment, as described above, the link profile LP1 created by the link profile creation unit 101 comprises a multidimensional lookup table LLU2 that is created via synthesis such that the brightness characteristic is offset by the inverse brightness characteristic conversion XLAr2. Therefore, in the multidimensional lookup table LLU2, the relationship between the rate at which the input value increases and the rate at which the output value increases becomes essentially uniform. Consequently, because the input/output relationship for the color conversion parameter component approaches a linear relationship and the relationship between the rate at which the input value increases and the rate at which the output value increases does not vary significantly, color conversion can be achieved with sufficient accuracy when interpolation is used.

Second Embodiment

In the first embodiment described above, a link profile LP1 was created while the scanner 13 profile was used as the input profile PF1 and the printer 12 profile was used as the output profile PF2. Conversion from the XYZ color system to the Lab color system was carried out using this link profile LP1.

In the second embodiment described below, an example in which color conversion is carried out from the Lab color system to the XYZ color system is described. In the second embodiment, the functions and constructions of the image processing system 1 and the main processor 10 are basically identical to those in the first embodiment. Therefore, the drawings and descriptions used for the first embodiment apply to the second embodiment as well regarding parts and components that are not different from the first embodiment. This principle applies to the third and subsequent embodiments as well.

Figure 10:
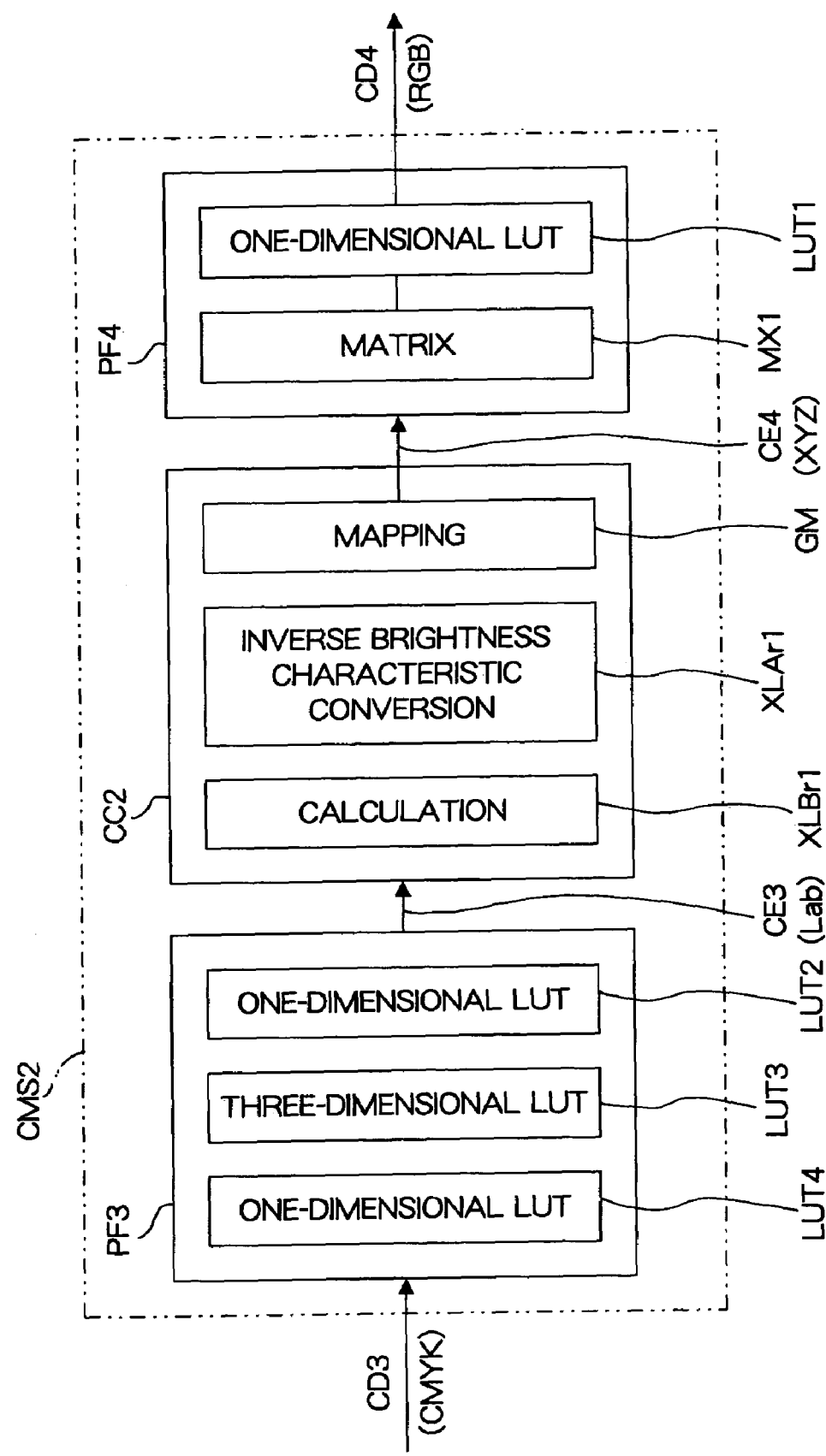
FIG. 10 is a drawing showing an example of the functions of the color management system in the main processor.
Figure 11:
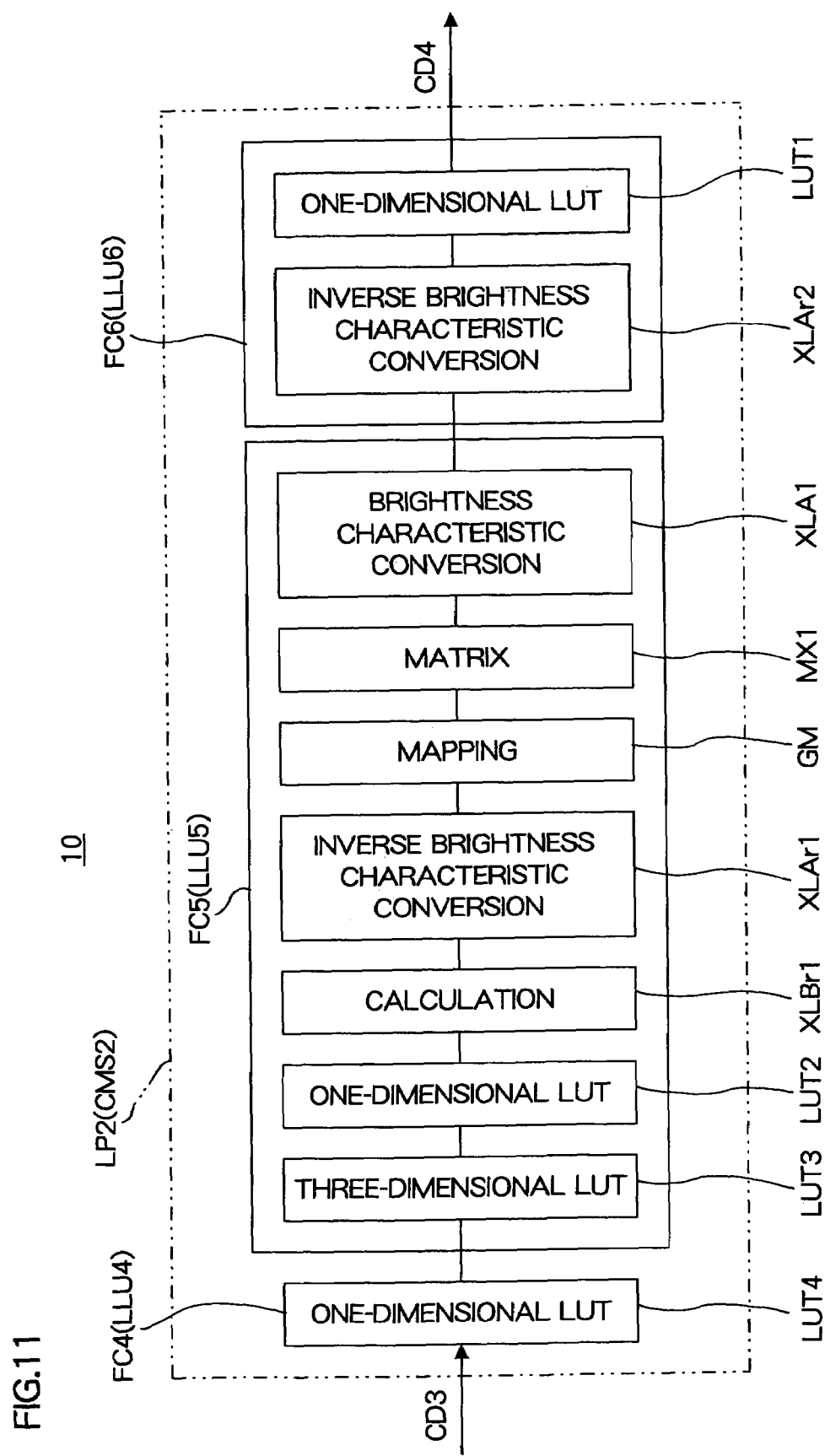
FIG. 11 is a drawing showing an example of the functions of a link profile created in the main processor.
Figure 12:
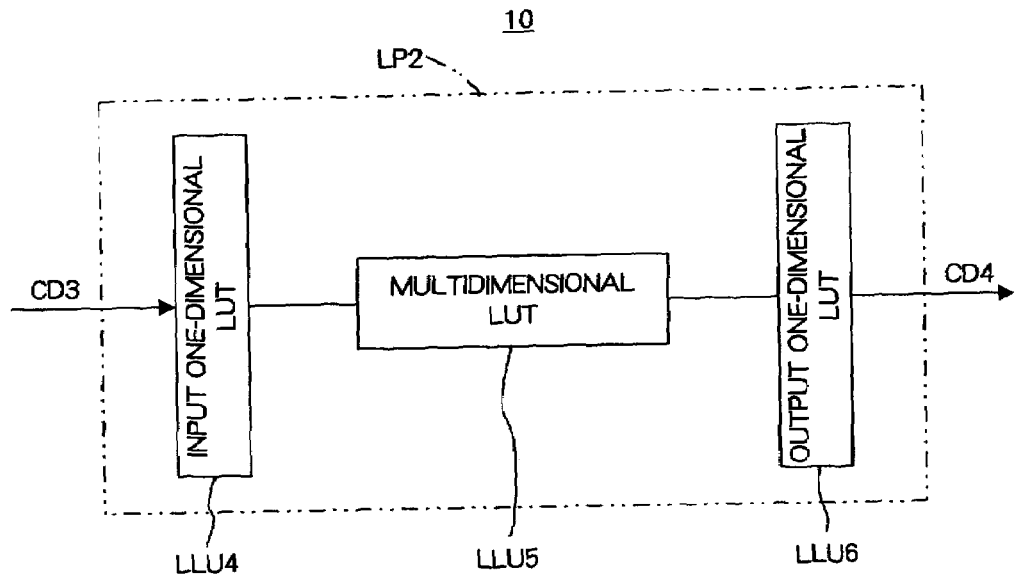
FIG. 12 is a drawing showing an example of the construction of the link profile.

FIG. 10 shows an example of the functions of the color management system CMS2 in the main processor 10. FIG. 11 shows an example of the functions of a link profile LP2 created in the main processor 10. FIG. 12 shows an example of the construction of the link profile LP2.

As shown in FIG. 10, in the color management system CMS2 in the main processor 10, color conversion, brightness characteristic conversion and other various conversions and adjustments based on the input profile PF3, the color conversion data CC2 and the output profile PF4 are performed to the CMYK color data CD3, and the resulting color data is output as RGB color data CD4. The color management system CMS2 shown in FIG. 10 carries out color conversion in the inverse direction from that performed by the color management system CMS1 shown in FIG. 4.

In other words, the input profile PF3 has a function to perform conversion in the reverse direction from the conversion based on the output profile PF2 shown in FIG. 4, and comprises a one-dimensional lookup table LUT2, a three-dimensional lookup table LUT3, and a one-dimensional lookup table LUT4.

The output profile PF4 has a function to perform conversion in the reverse direction from the conversion based on the input profile PF1 shown in FIG. 4, and comprises a matrix MX1 and a one-dimensional lookup table LUT1.

The color conversion data CC2 includes data or calculation formulae to carry out color conversion of Lab color data CE3 into XYZ color data CE4, data or calculation formulae for gamut mapping GM, and the like.

Figure 7B:
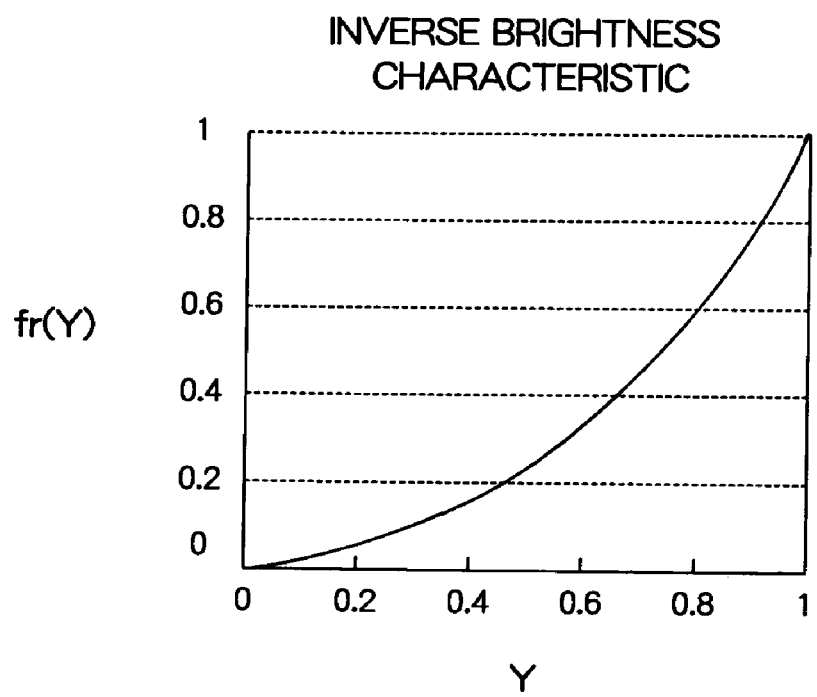

In the color conversion data CC2 of the second embodiment, as shown in FIG. 10, the data or calculation formulae for color conversion XL are divided into inverse brightness characteristic conversion XLAr1 and calculation XLBr1. The inverse brightness characteristic conversion XLAr1 converts the L value based on the Lab color system into a Y value based on the XYZ color system. For this conversion, the horizontal axis in FIG. 7(B) is deemed 'L' and the vertical axis is deemed 'Y'.

As shown in FIG. 11, in the link profile LP2 of the second embodiment, placed after the one-dimensional lookup table LUT4 are such functions as the three-dimensional lookup table LUT3, the one-dimensional lookup table LUT2, the calculation XLBr1, the inverse brightness characteristic conversion XLAr1, the gamut mapping GM, the matrix MX1, the brightness characteristic conversion XLA1, the inverse brightness characteristic conversion XLAr2 and the one-dimensional lookup table LUT1. The one-dimensional lookup table LUT 4 is used by itself as a single function component FC4, while the three-dimensional lookup table LUT3, one-dimensional lookup table LUT2, calculation XLBr1, inverse brightness characteristic conversion XLAr1, gamut mapping GM, matrix MX1 and brightness characteristic conversion XLA1 are aggregated as a single function component FC5, and the inverse brightness characteristic conversion XLAr2 and one-dimensional lookup table LUT1 are aggregated as a single function component FC6.

Then an input one-dimensional lookup table LLU4, multidimensional lookup table LLU5 and output one-dimensional lookup table LLU6 are created such that the function components FC4, FC5 and FC6 are respectively represented thereby, as shown in FIG. 12.

In other words, in the multidimensional lookup table LLU5, the brightness characteristic conversion XLA1 is applied last. The synthesized result including the brightness characteristic conversion XLA1 becomes the multidimensional lookup table LLU5. Therefore, within the multidimensional lookup table LLU5, the inverse brightness characteristic of the inverse brightness characteristic conversion XLAr1 and the brightness characteristic of the brightness characteristic conversion XLA1 offset each other, and as a result, the input/output relationship of the multidimensional lookup table LLU5 becomes closer to a linear relationship. Consequently, the relationship between the rate at which the input value increases and the rate at which the output value increases in the multidimensional lookup table LLU5 becomes essentially uniform, and sufficient accuracy can be obtained when seeking the color data values to output via interpolation based on the input color data values, resulting in improved interpolation accuracy.

The inverse brightness characteristic conversion XLAr2 is included in the output one-dimensional lookup table LLU6 in addition to the one-dimensional lookup table LUT1. The synthesized result of these functions becomes the output one-dimensional lookup table LLU6. Therefore, the brightness characteristic conversion XLA1 added to the multidimensional lookup table LLU5 and this inverse brightness characteristic conversion XLAr2 offset each other, resulting in appropriate processing as a whole.

Using the second embodiment as well, as described above, a link profile LP2 created by the link profile creation unit 101 comprises a synthesized multidimensional lookup table LLU5 in which the brightness characteristic is offset by the inverse brightness characteristic conversion XLAr2. Consequently, because the input/output relationship for the color conversion parameter component approaches a linear relationship and the relationship between the rate at which the input value increases and the rate at which the output value increases does not vary significantly, color conversion can be achieved with sufficient accuracy when interpolation is utilized.

Third Embodiment

A third embodiment that is constructed such that the processing mode for the link profile creation unit 101 is selected depending on the type of color conversion as described below.

Figure 13:
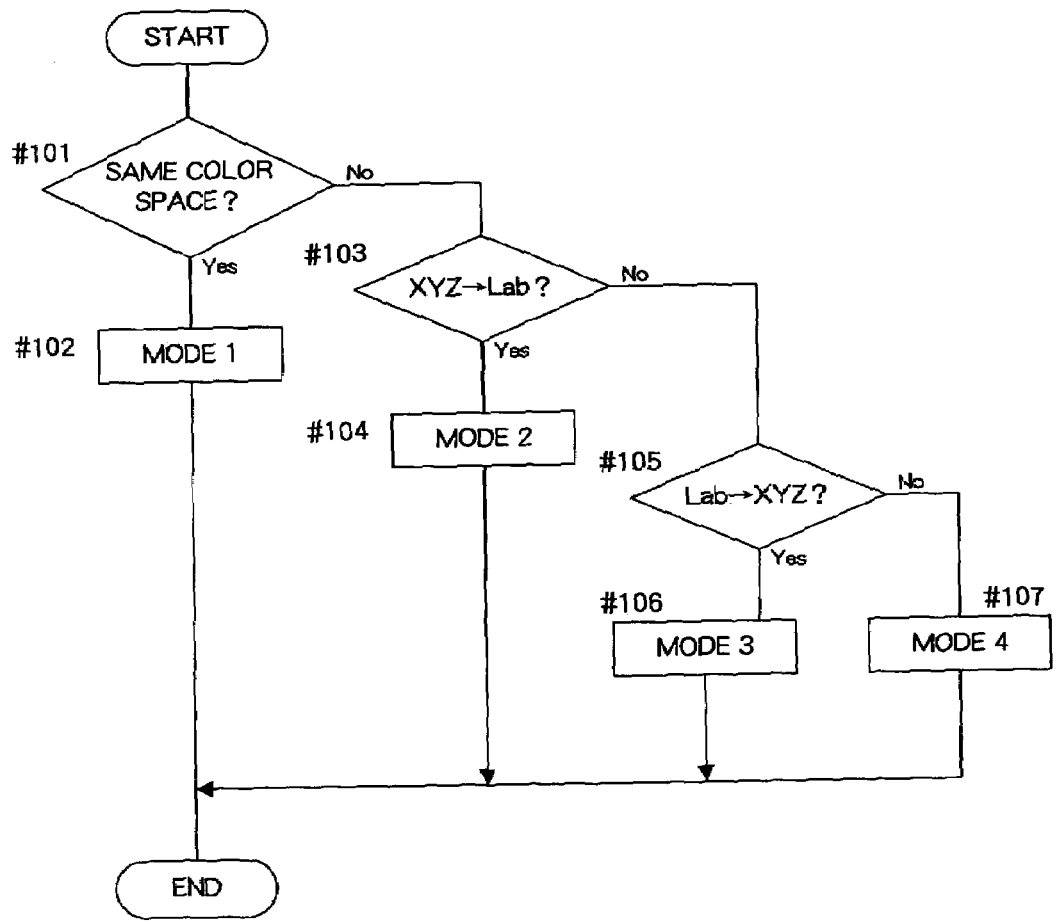
FIG. 13 is a flow chart showing the sequence of operations performed to set the processing mode.

FIG. 13 is a flow chart showing the sequence of operations to set the processing mode for the link profile creation unit 101.

With reference to FIG. 13, it is checked, in connection with the color conversion in the color management system CMS, whether or not the color space before conversion and the color space after conversion are identical (#101). Where they are identical, mode 1 is selected (#102). Where the conversion is from the XYZ color system to the Lab color system (YES in #103), mode 2 is selected (#104). Where the conversion is from the Lab color system to the XYZ color system (YES in #105), mode 3 is selected (#104). For others, mode 4 is selected (#107).

In mode 1, because the color space before conversion is identical to the color space after conversion, color conversion is performed without adding brightness characteristic conversion or inverse brightness characteristic conversion to the color management system CMS1 shown in FIG. 4. In other words, with reference to FIG. 5, for example, the brightness characteristic conversion XLA2 and the inverse brightness characteristic conversion XLAr2 are omitted. Therefore, in this case, the input one-dimensional lookup table LUT1 in FIG. 6 does not include the brightness characteristic conversion XLA.

In mode 2, conversion from the XYZ color system to the Lab color system is carried out by the color management system CMS1 described with reference to the first embodiment. In other words, a link profile LP1 such as the one shown in FIGS. 5 and 6 is created, and color conversion is performed based thereon.

In mode 3, conversion from the Lab color system to the XYZ color system is carried out by the color management system CMS2 described with reference to the second embodiment. In other words, a link profile LP2 such as the one shown in FIGS. 11 and 12 is created, and color conversion is performed based thereon.

In mode 4, appropriate processing is carried out in accordance with the nature of the color conversion.

According to the third embodiment, the processing mode for the link profile creation unit 101 is selected depending on the type of color conversion, and appropriate color conversion is performed in accordance with the nature thereof, as described above. Therefore, color conversion is achieved with sufficient accuracy regardless of the combination of profiles.

Fourth Embodiment

In the fourth embodiment, in the link profile LP1 shown in FIG. 6, the one-dimensional lookup table LUT1 is incorporated in the multidimensional lookup table LLU2, such that the input one-dimensional lookup table LLU1 is omitted. In this case, where the results obtained by combining the values obtained from the one-dimensional lookup table LUT1 with the brightness characteristic conversion XLA1 has a linear relationship, the brightness conversion via the one-dimensional lookup table LUT1 and the brightness conversion via the brightness characteristic conversion XLA1 offset each other, and consequently the input/output relationship in the multidimensional lookup table LLU2 becomes closer to a linear relationship.

Fifth Embodiment

In each embodiment described above, brightness characteristic conversion XLA was used for correction of the one-dimensional lookup table LUT1, but it is also acceptable if a YL conversion curve or an LY conversion curve is used instead. Namely, calculation to convert Y values based on the XYZ color system to L values based on the Lab color system, or calculation to convert L values based on the Lab color system to Y values based on the XYZ color system is performed. These conversions are respectively represented by FIG. 7(A) in which the horizontal axis is deemed 'Y' and the vertical axis is deemed 'L', and by FIG. 7(B) in which the horizontal axis is deemed 'L' and the vertical axis is deemed 'Y'. In the conversion, the input values are normalized in the range 0-1.

Figure 14:
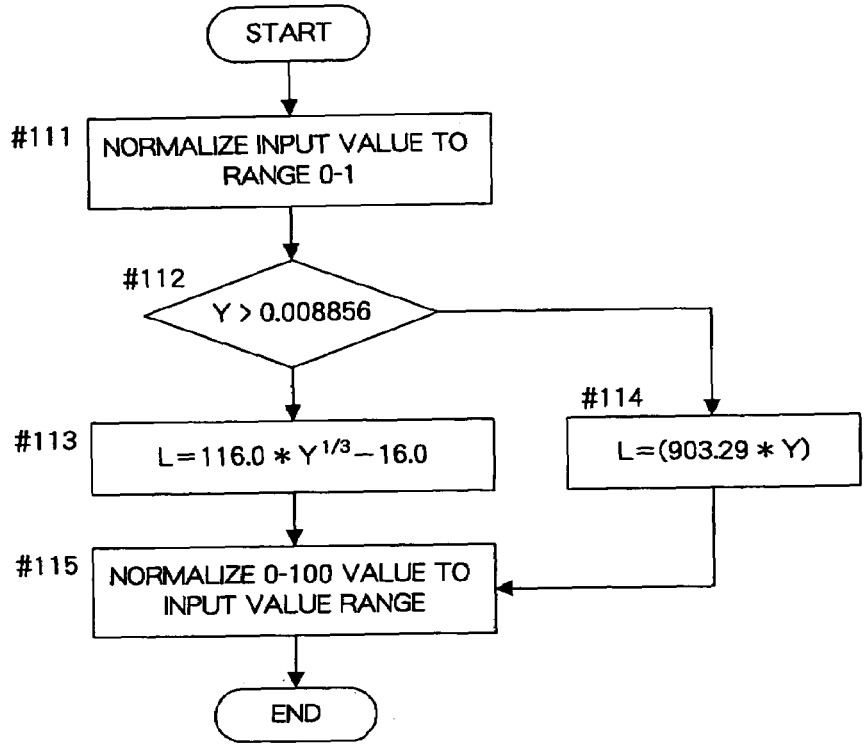
FIG. 14 is a flow chart for YL conversion.
Figure 15:
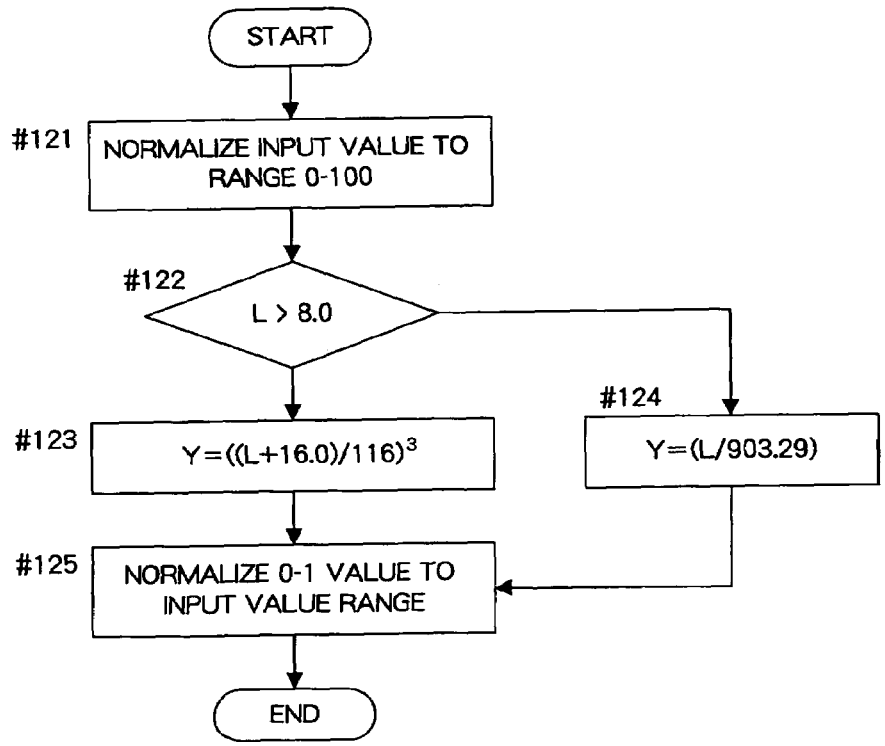
FIG. 15 is a flow chart for LY conversion.

FIG. 14 is a flow chart for YL conversion, and FIG. 15 is a flow chart for LY conversion.

With reference to FIG. 14, the input value is normalized in the range 0-1 (#111), and according to the Y value (#112), the calculation of step #113 or step #114 is carried out.

Calculation based on the following formula is carried out in step #113.

$$L=116(Y)^{1/3}-16$$

provided, Y>0.008856

Calculation based on the following formula is carried out in step #114.

$$L=903.29XY$$

provided, Y≦0.008856

The value in the range 0-100 is then normalized into the input value range (#115).

In FIG. 15, the input value is normalized in the range 0-100 (#121), and according to the L value (#122), the calculation of step #123 or step #124 is carried out.

Calculation based on the following formula is carried out in step #123.

$$Y=[(L+16.0)/116]^3$$

provided, L>8.0

Calculation based on the following formula is carried out in step #124.

$$Y=L/903.29$$

provided, Y≦8.0

The value in the range 0-1 is then normalized into the input value range (#125).

Sixth Embodiment

In the following sixth embodiment, an example in which color conversion is carried out from the XYZ color system to the XYZ color system is described.

Figure 16:
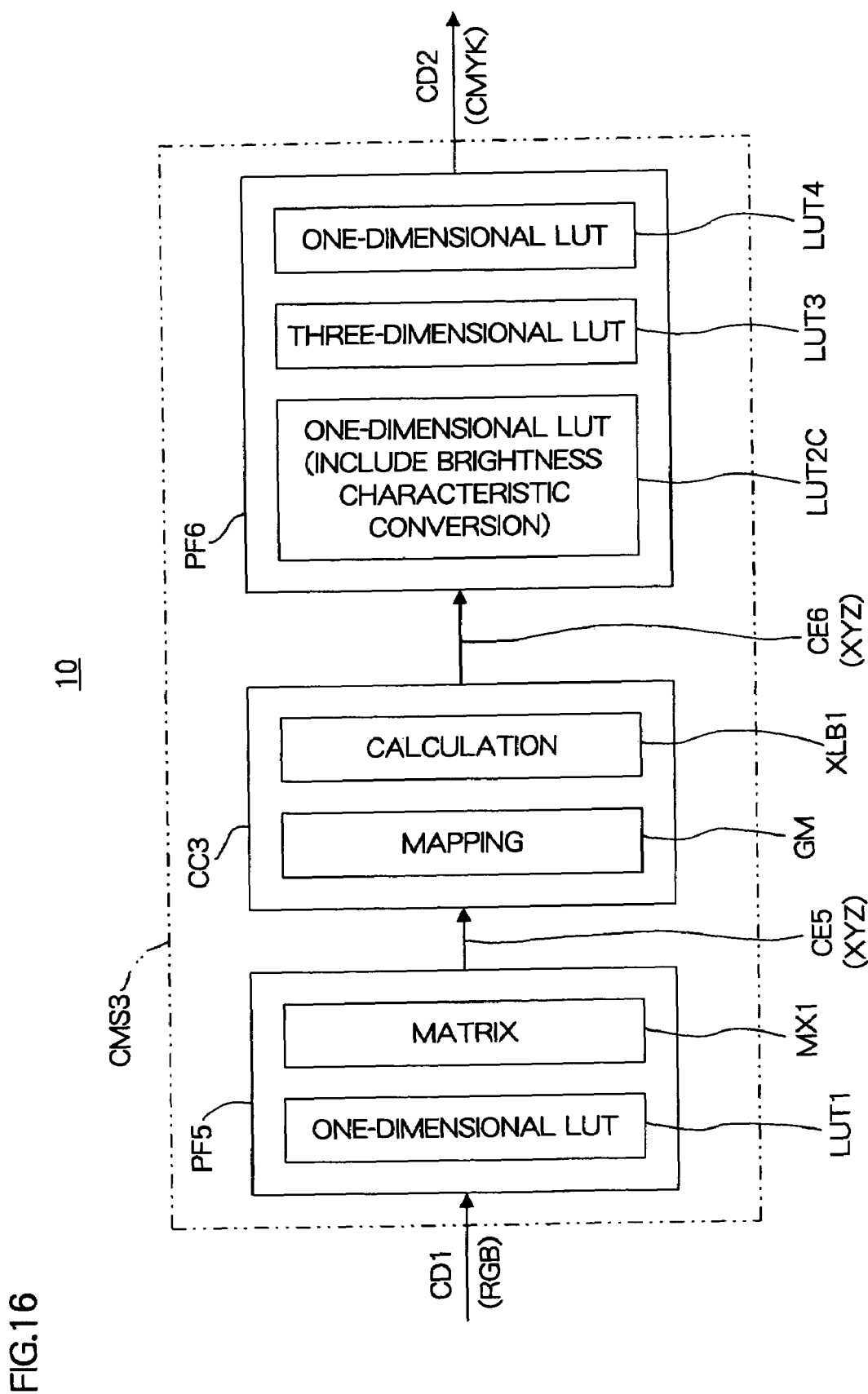
FIG. 16 shows an example of the functions of the color management system of a sixth embodiment.
Figure 17:
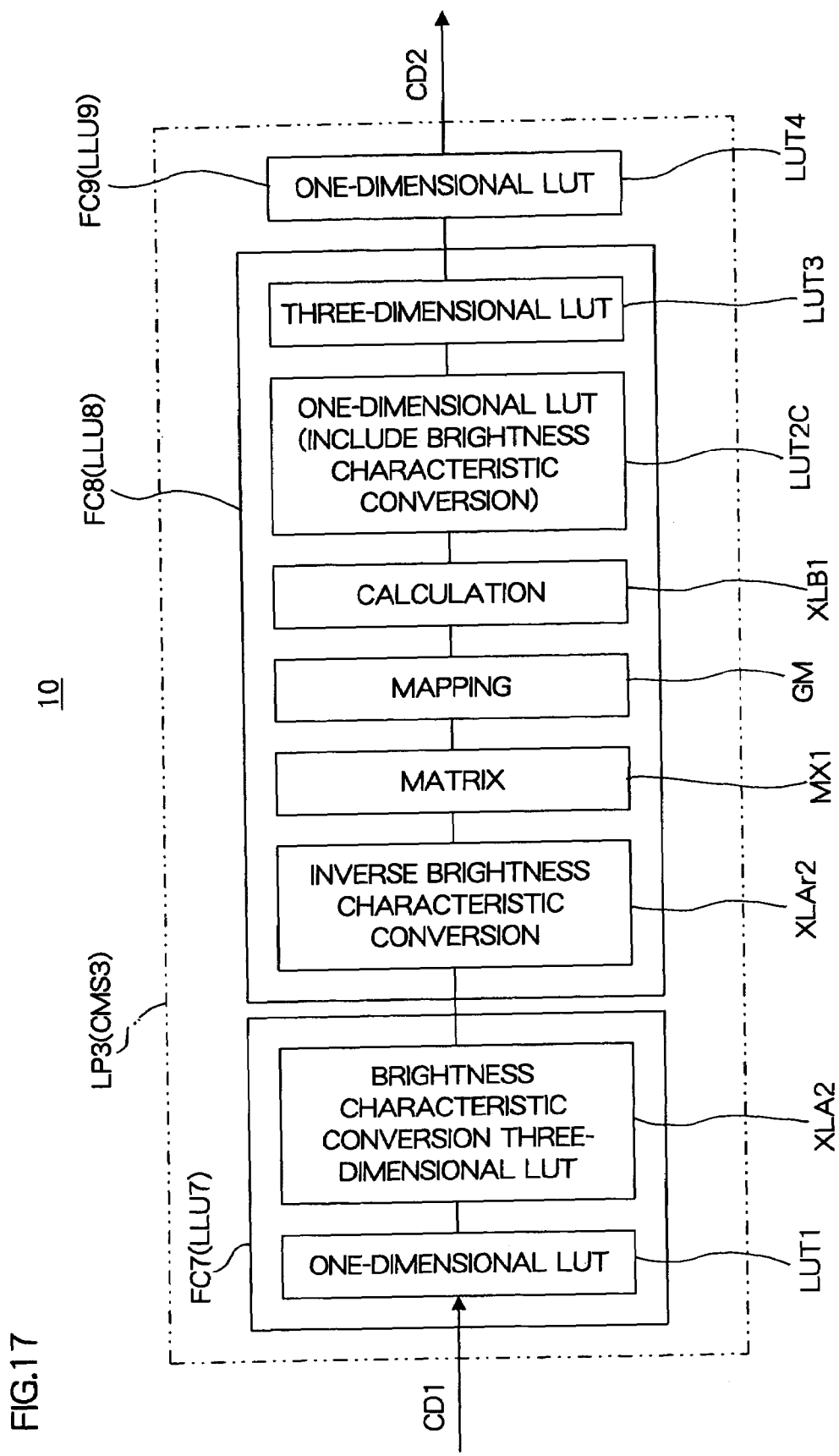
FIG. 17 shows an example of the functions of a link profile created in the main processor.
Figure 18:
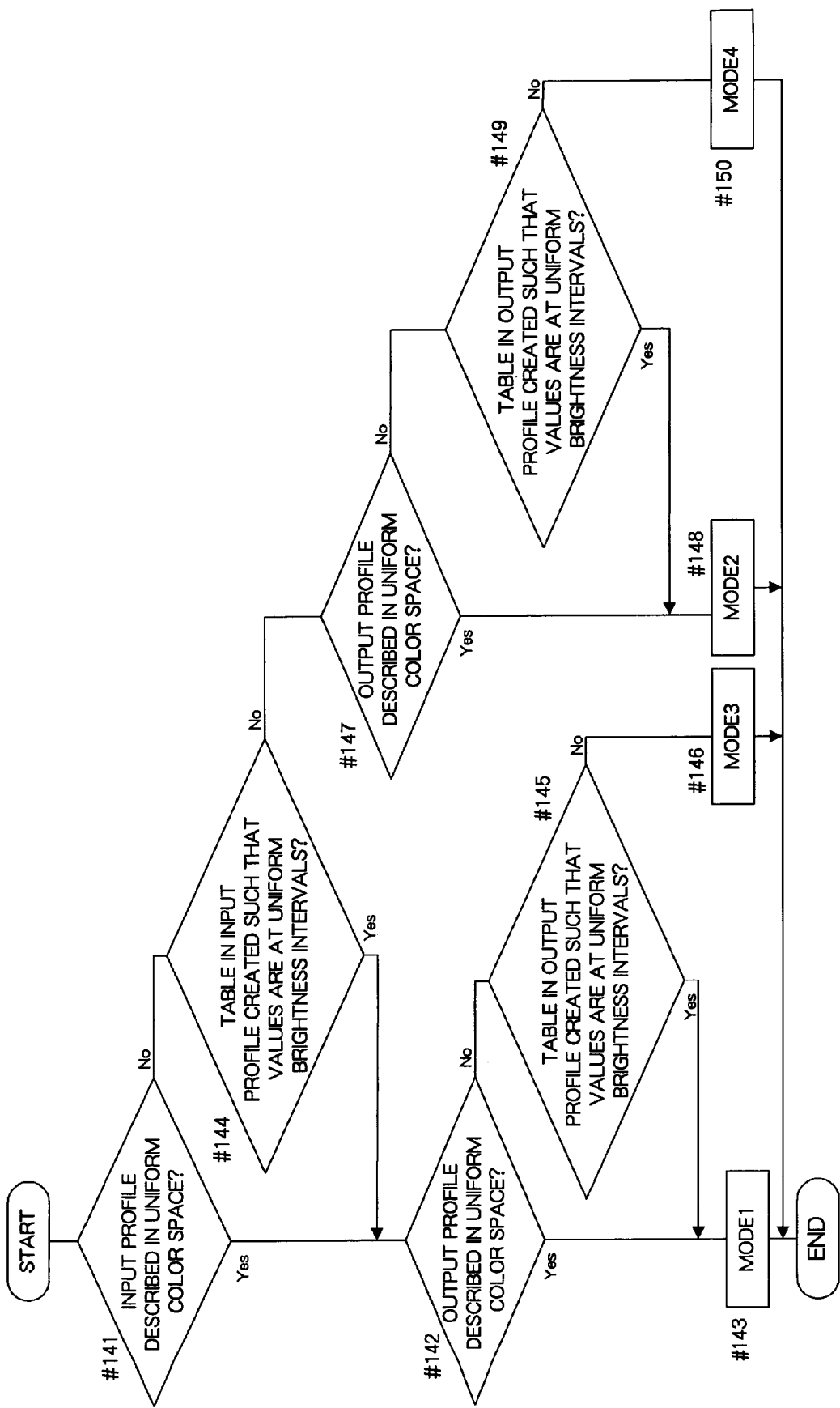
FIG. 18 is a flow chart showing another example of the sequence of operations performed to set the processing mode.

FIG. 16 shows an example of the functions of the color management system CMS3 in the main processor 10 of the sixth embodiment. FIG. 17 shows an example of the functions of a link profile LP3 created in the main processor 10. FIG. 18 is a flow chart showing the sequence of operations carried out to set the processing mode that incorporates the sixth embodiment.

With reference to FIG. 16, in the color management system CMS3, color data CD1 is subjected to color conversion, brightness characteristic conversion and other various conversions and adjustments based on the input profile PF5, color conversion data CC3 and output profile PF6, and the resulting color data is output as color data CD2.

The output profile PF6 accepts color data CE4 that is input based on the XYZ color system. A profile for which the input is XYZ color data CE4 may include brightness characteristic conversion in the one-dimensional lookup table LUT2C, and the three-dimensional lookup table LUT3 thereof may be created to have values at uniform brightness intervals. Where such a profile is used as the output profile PF6, even if the conversion is from the XYZ color system to the XYZ color system, correction is made to the one-dimensional lookup table LUT1 in the input profile PF5.

In other words, as shown in FIG. 16, in the color management system CMS3, such functions as the brightness characteristic conversion XLA2, inverse brightness characteristic conversion XLAr2, matrix MX1 and the like are placed after the one-dimensional lookup table LUT1. The one-dimensional lookup table LUT1 and brightness characteristic conversion XLA2 are aggregated as a single function component FC7, the inverse brightness characteristic conversion XLAr2, matrix MX1, gamut mapping GM, calculation XLB1, one-dimensional lookup table LUT2C and three-dimensional lookup table LUT3 are aggregated as a single function component FC8, and the one-dimensional lookup table LUT4 is used by itself as a single function component FC9.

The function components FC7, FC8 and FC9 respectively become an input one-dimensional lookup table LLU7, a multidimensional lookup table LLU8 and an output one-dimensional lookup table LLU9.

An example in which the processing mode for the link profile creation unit 101 is selected depending on the type of color conversion will now be described.

With reference to FIG. 18, where both the input profile and the output profile are described in a uniform color space, i.e., the Lab space, for example (YES in #141 and #142), mode 1 in which the one-dimensional lookup tables of the profiles are used as is is selected (#143).

Even if the answer in step #141 or #142 is NO, where the table in the input profile or the output profile is created such that the values are at uniform brightness intervals (YES in #144 and 145), mode 1 is also selected. Where the answer is NO in step #145, mode 3 that utilizes a brightness correction curve as the output one-dimensional lookup table is selected (#146).

Where the answer in step #144 is NO, if the output profile is described in an uniform color space (YES in #147), mode 2 that utilizes a brightness correction curve as the input one-dimensional lookup table is selected (#148).

Even if the answer in step #147 is NO, where the table in the input profile or the output profile is created such that the values are at uniform brightness intervals (YES in #149), mode 2 is also selected. If the answer is NO in step #149, mode 4 in which the one-dimensional lookup tables of the profiles are used as is is selected (#150).

In order to determine whether the table of a profile is uniform as to the brightness, the following method can be used. (1) Check the characteristics of the one-dimensional lookup tables as to whether or not processing equivalent to brightness characteristic conversion is included. Where the tables are used for conversion from the XYZ color system to the CMYK color system, check the front-end one-dimensional lookup table to see whether or not processing equivalent to brightness characteristic conversion is included. Where the tables are used for conversion from the CMYK color system to the XYZ color system, check the rear-end one-dimensional lookup table to see whether or not processing equivalent to inverse brightness characteristic conversion is included. (2) Make the determination based on the profile construction. Namely, if the profile comprises a lookup table, it is determined that uniformity exists, and if the profile comprises a matrix, it is determined that uniformity does not exist. Other methods can also be used.

The overall sequence of operations in the image processing system 1 will now be described with reference to a flow chart.

Figure 19:
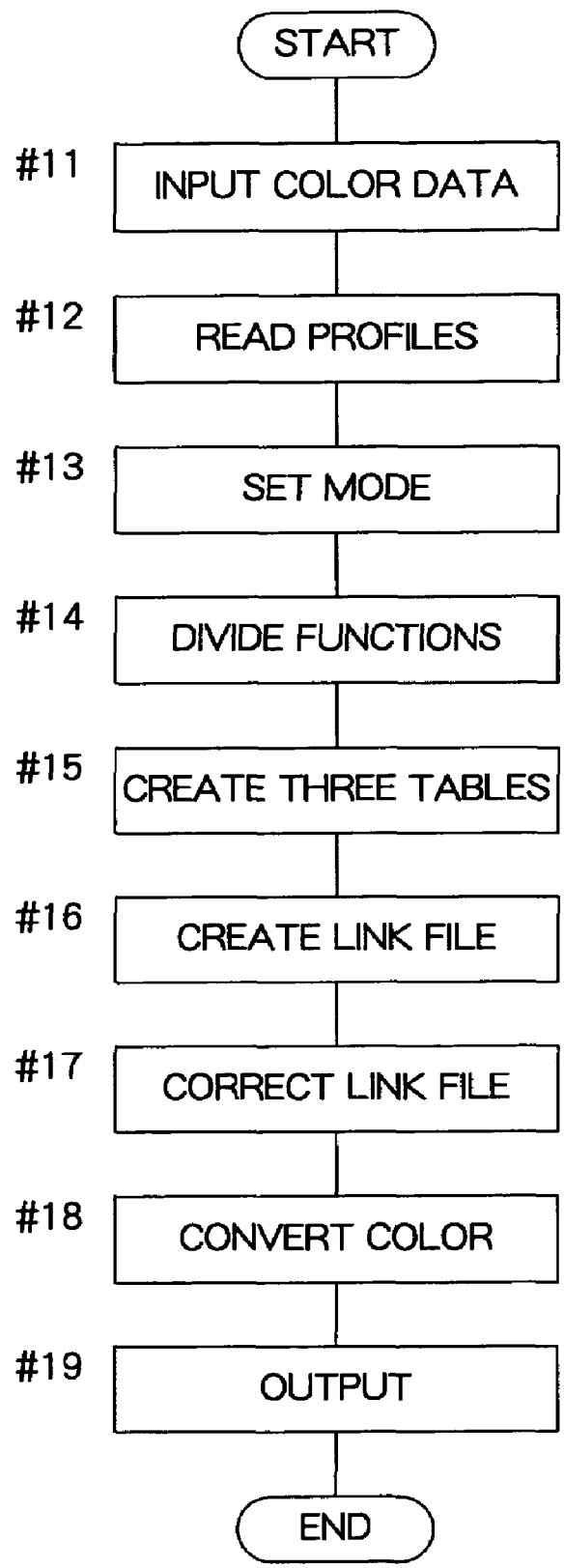
FIG. 19 is a flow chart showing the overall sequence of operations.

FIG. 19 is a flow chart showing the overall sequence of operations in the image processing system 1.

With reference to FIG. 19, color data CD is input (#11), and device profiles are input (#12). Based on the contents of the device profiles, the input color space and the output color space are checked, and a mode is selected based on the result of such checking (#13). Processing is subsequently carried out in accordance with the selected mode. The functions of the color management system CMS are divided into three groups depending on the device profiles and the content of the color conversion data (#14), and three tables or matrices corresponding to each function group are created (#15). In doing so, where brightness characteristic conversion, which is conversion to match the human perceived brightness characteristic, is included, it is incorporated in the input one-dimensional lookup table or the output one-dimensional lookup table such that it is not included in the multidimensional lookup table or matrix. Accordingly, a link profile LP is created (#16) and is subjected to correction (#17). Color conversion is carried out using the obtained link profile LP (#18), and color data CD that is obtained as a result of the color conversion is output (#19).

In the embodiments described above, the content of the color conversion data CC is equivalent to the color space conversion parameters in the present invention, and the contents of the color management systems CMS1 and CMS2 are equivalent to the overall conversion parameters in the present invention. The function components FC2 and FC5 are equivalent to the color conversion parameter component of the present invention, and the function components FC1 and FC4 and the function components FC3 and FC6 are respectively equivalent to the pre-processing component and the post-processing component of the present invention.

In addition, the processing of step #14, the processing of step #15, and the processing of step #16 are respectively equivalent to the dividing unit, incorporating unit and holding unit of the present invention.

In the embodiments described above, the order of the functions or processing operations of the multidimensional lookup table LLU may be freely changed. Functions and processing operations may also be omitted or added depending on the nature of the color conversion.

In the embodiments describe above, a matrix may be used in place of the multidimensional lookup table LLU. Such a matrix may comprise calculation formulae for color conversion, calculation coefficients, a calculation program or other conversion calculator. The color conversion function of the main processor 10 may be provided in the form of a color management module.

The construction, shape, size, quantity and/or the contents or order of the processing operations with regard to the entire main processor 10 or image processing system 1 or parts thereof may be changed within the essential scope of the present invention.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A device link profile creation method to create a device link profile by which to carry out color conversion between multiple devices, wherein the overall conversion parameters including an input device profile, color space conversion parameters and an output device profile are divided into a color conversion parameter component that indicates the parameters for color conversion, a pre-processing component positioned before the color conversion parameter component, and a post-processing component positioned after the color conversion parameter component, and wherein if brightness characteristic conversion comprising conversion to match the perceived brightness characteristic is included, such brightness characteristic conversion is incorporated in said pre-processing or post-processing component, and said pre-processing component, color conversion parameter component and post-processing component are respectively aggregated as tables or conversion calculation units.

2. The device link profile creation method according to claim 1, wherein where said conversion parameters for color space conversion includes conversion from a non-uniform color space to a uniform color space relative to human perception, the brightness characteristic conversion included therein is incorporated in said pre-processing component, and said pre-processing component is aggregated as a single one-dimensional lookup table.

3. The device link profile creation method according to claim 1, wherein where said conversion parameters for color space conversion include conversion from a uniform color space to a non-uniform color space relative to human perception, the inverse brightness characteristic conversion included therein is incorporated in said post-processing component, and said post-processing component is aggregated as a single one-dimensional lookup table.

4. The device link profile creation method according to claim 1, wherein where said conversion parameters for color space conversion include conversion from a non-uniform color space to a uniform color space relative to human perception, the brightness characteristic conversion included therein is incorporated in said pre-processing component, and said pre-processing component is aggregated as calculation formulae or as a matrix comprising coefficients.

5. The device link profile creation method according to claim 1, wherein where said conversion parameters for color space conversion includes conversion from a uniform color space to a non-uniform color space relative to human perception, the inverse brightness characteristic conversion included therein is incorporated in said post-processing component, and said post-processing component is aggregated as calculation formulae or as a matrix comprising coefficients.

6. A device to create a device link profile by which to carry out color conversion between multiple devices, having:
dividing unit that divides the overall conversion parameters including an input device profile, color space conversion parameters and an output device profile into a color conversion parameter component that indicates the parameters for color conversion, a pre-processing component positioned before the color conversion parameter component, and a post-processing component positioned after the color conversion parameter component;
component unit that, where said color space conversion parameters include brightness characteristic conversion that consists of conversion to match human perception, incorporates said brightness characteristic conversion in said pre-processing or post-processing component; and
synthesizing unit that holds each of said pre-processing component, color conversion parameter component and post-processing component as a single table or the conversion calculator.

7. An image processing apparatus that performs color conversion among multiple devices, having:
a creation unit that creates a device link profile by synthesizing the device profiles of said multiple devices; and
a conversion unit that converts the input color data into output color data based on the created device link profile, wherein said creation unit has:
a dividing unit that divides the overall conversion parameters including an input device profile, color space conversion parameters and an output device profile into a color conversion parameter component that indicates the parameters for color conversion, a pre-processing component positioned before the color conversion parameter component, and a post-processing component positioned after the color conversion parameter component;

an incorporating unit that, where said color space conversion parameters include brightness characteristic conversion that consists of conversion to match human perception, incorporates said brightness characteristic conversion in said pre-processing or post-processing component such that it is not included in said color conversion parameter component;

a creation unit that holds each of said pre-processing component, color conversion parameter component and post-processing component as a single table or the conversion calculator; and a synthesizing unit that synthesizes said three tables or conversion calculator into one device link profile.

8. The image processing apparatus according to claim 7, wherein said device link profile comprises a one-dimensional lookup table that aggregates said pre-processing component, a multidimensional lookup table or conversion calculator that aggregates said color conversion parameter component together, and a one-dimensional lookup table that aggregates said post-processing component.

9. The image processing apparatus according to claim 7, wherein said device link profile comprises a matrix that consists of calculation formulae or coefficients and aggregates said pre-processing component, a multidimensional lookup table or conversion calculator that aggregates said color conversion parameter component, and a matrix consisting of calculation formulae or coefficients and aggregates said post-processing component.

10. An image processing apparatus that performs color conversion among multiple devices, including:

an obtaining unit that obtains the profiles of said multiple devices for color conversion;

a creation unit that creates a device link profile by synthesizing said multiple profiles; and a color conversion unit that performs color conversion using the created device link profile, wherein said device link profile includes an input one-dimensional lookup table, multidimensional lookup table or matrix and an output one-dimensional lookup table, and where said device link profile includes brightness characteristic conversion, which consists of conversion to match human perception, said brightness characteristic conversion is incorporated in said input one-dimensional lookup table or output one-dimensional lookup table such that it is not included in said multidimensional lookup table or matrix.

11. A computer readable medium storing a computer program having the following processing steps to operate a system to create a device link profile for color conversion between multiple devices, having the steps of:

dividing the overall conversion parameters including the input device profile, color space conversion parameters and output device profile into a color conversion parameter component that indicates the parameters for color conversion, a pre-processing component positioned before the color conversion parameter component, and a post-processing component positioned after the color conversion parameter component;

where brightness characteristic conversion comprising conversion to match the perceived brightness characteristic is included in said dividing step, incorporating such brightness characteristic conversion in said pre-processing or post-processing component such that said conversion is not included in said color conversion parameter component; and aggregating said pre-processing component, color conversion parameter component and post-processing component respectively as tables or conversion calculation formulae.

12. The computer readable medium according to claim 11, wherein where said conversion parameters for color space conversion include conversion from a non-uniform color space to a uniform color space relative to human perception, the brightness characteristic conversion included therein is incorporated in said pre-processing component, and the pre-processing component is aggregated as a single one-dimensional lookup table.

13. The computer readable medium according to claim 12, wherein where said conversion parameters for color space conversion include conversion from a uniform color space to a non-uniform color space relative to human perception, the inverse brightness characteristic conversion included therein is incorporated in said post-processing component, and the post-processing component is aggregated as a single one-dimensional lookup table.

14. The computer readable medium according to claim 11, wherein where said conversion parameters for color space conversion include conversion from a non-uniform color space to a uniform color space relative to human perception, the brightness characteristic conversion included therein is incorporated in said pre-processing component, and the pre-processing component is aggregated as calculation formulae or as a matrix comprising coefficients.

15. The computer readable medium according to claim 14, wherein where said conversion parameters for color space conversion include conversion from a uniform color space to a non-uniform color space relative to human perception, the inverse brightness characteristic conversion included therein is incorporated in said post-processing component, and the post-processing component is aggregated as calculation formulae or as a matrix comprising coefficients.

* * * * *